(12) United States Patent
Wilson et al.

(10) Patent No.: US 11,104,616 B2
(45) Date of Patent: Aug. 31, 2021

(54) CERAMIC HAVING A RESIDUAL COMPRESSIVE STRESS FOR USE IN ELECTRONIC DEVICES

(71) Applicant: Apple Inc., Cupertino, CA (US)

(72) Inventors: James R. Wilson, Cupertino, CA (US); Christopher D. Jones, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/267,088

(22) Filed: Sep. 15, 2016

(65) Prior Publication Data

US 2017/0088473 A1 Mar. 30, 2017

Related U.S. Application Data

(60) Provisional application No. 62/234,783, filed on Sep. 30, 2015.

(51) Int. Cl.
*C04B 35/64* (2006.01)
*C04B 41/50* (2006.01)
(Continued)

(52) U.S. Cl.
CPC .............. *C04B 35/64* (2013.01); *B32B 18/00* (2013.01); *C04B 37/001* (2013.01);
(Continued)

(58) Field of Classification Search
CPC ............ C04B 2201/50; C04B 41/0081; C04B 41/4351; C04B 41/81; C04B 41/4535;
(Continued)

(56) References Cited

U.S. PATENT DOCUMENTS 4,764,491 A * 8/1988 Quadir .................. C04B 35/486
501/103
4,833,001 A 5/1989 Kijima et al.
(Continued)

FOREIGN PATENT DOCUMENTS

CN 105622096 6/2016
EP 0826645 3/1998
(Continued)

OTHER PUBLICATIONS

Merriam-Webster.com—Perimeter; https://www.merriam-webster.com/dictionary/perimeter; Oct. 7, 2020 (Year: 2020).*
(Continued)

*Primary Examiner* — Humera N. Sheikh
*Assistant Examiner* — Elizabeth D Ivey
(74) *Attorney, Agent, or Firm* — Dorsey & Whitney LLP

(57) ABSTRACT

A toughened ceramic component having a residual compressive stress and methods of forming the toughened ceramic component is disclosed. The ceramic component may include an internal portion having a first coefficient of thermal expansion (CTE) and an external portion substantially surrounding the internal portion and forming an exterior surface of the ceramic component. The external portion may have a second CTE that is less than the first CTE. Additionally, the external portion may be in compressive stress.

6 Claims, 28 Drawing Sheets

(51) Int. Cl.
*C04B 41/00* (2006.01)
*C04B 41/87* (2006.01)
*B32B 18/00* (2006.01)
*H04M 1/18* (2006.01)
*C04B 111/00* (2006.01)
*C04B 37/00* (2006.01)

(52) U.S. Cl.
CPC ........ *C04B 41/009* (2013.01); *C04B 41/5042* (2013.01); *C04B 41/5045* (2013.01); *C04B 41/87* (2013.01); *C04B 2111/00844* (2013.01); *C04B 2235/6025* (2013.01); *C04B 2235/9607* (2013.01); *C04B 2237/58* (2013.01); *C04B 2237/582* (2013.01); *C04B 2237/588* (2013.01); *C04B 2237/84* (2013.01); *H04M 1/185* (2013.01)

(58) Field of Classification Search
CPC . C04B 35/64; C04B 2235/9607; C03B 32/02; C23C 28/3455
See application file for complete search history.

(56) References Cited

U.S. PATENT DOCUMENTS

| | | | |
|---|---|---|---|
| 4,857,093 A | 8/1989 | Prewo et al. | |
| 6,133,181 A | 10/2000 | Wentworth et al. | |
| 6,274,525 B1* | 8/2001 | Zborowski | C03B 5/1672 501/120 |
| 8,076,011 B2 | 12/2011 | Chiang et al. | |
| 8,251,210 B2 | 8/2012 | Schmidt et al. | |
| 8,298,975 B2 | 10/2012 | Hasegawa et al. | |
| 8,322,560 B2 | 12/2012 | Jiang et al. | |
| 8,442,604 B1 | 5/2013 | Diebel | |
| 8,563,644 B2 | 10/2013 | Imada et al. | |
| 8,781,109 B2 | 7/2014 | Hong | |
| 9,007,747 B2 | 4/2015 | Gandhi | |
| 9,011,997 B2 | 4/2015 | Weber | |
| 9,448,713 B2 | 9/2016 | Cruz-Hernandez et al. | |
| 9,516,150 B2 | 12/2016 | Jeon et al. | |
| 2009/0197048 A1 | 8/2009 | Amin et al. | |
| 2010/0003479 A1 | 1/2010 | Hwang et al. | |
| 2012/0212890 A1* | 8/2012 | Hoshino | H04M 1/0202 361/679.01 |
| 2012/0268412 A1 | 10/2012 | Cruz-Hernandez et al. | |
| 2013/0078398 A1* | 3/2013 | Weber | B32B 37/144 428/34.1 |
| 2013/0108813 A1 | 5/2013 | Zhu | |
| 2013/0224454 A1 | 8/2013 | Jung et al. | |
| 2013/0316116 A1 | 11/2013 | Adams et al. | |
| 2014/0178642 A1 | 6/2014 | Milanovska et al. | |
| 2015/0010721 A1 | 1/2015 | Tanida et al. | |
| 2015/0246459 A1 | 9/2015 | Dorn et al. | |
| 2016/0089811 A1 | 3/2016 | Matsuyuki et al. | |
| 2016/0090326 A1 | 3/2016 | Matsuyuki et al. | |
| 2016/0234949 A1* | 8/2016 | Seo | H04M 1/0202 |
| 2016/0255929 A1 | 9/2016 | Nazzaro et al. | |
| 2016/0347674 A1 | 12/2016 | Meschke et al. | |
| 2017/0075039 A1* | 3/2017 | Hart | G02B 1/11 |
| 2017/0300114 A1 | 10/2017 | Matsuyuki et al. | |
| 2017/0361067 A1 | 12/2017 | Nazzaro et al. | |

FOREIGN PATENT DOCUMENTS

| | | |
|---|---|---|
| EP | 1857428 | 11/2007 |
| EP | 2243756 | 10/2010 |
| EP | 2266934 | 12/2010 |
| WO | WO 16/043378 | 3/2016 |

OTHER PUBLICATIONS

U.S. Appl. No. 15/098,836, filed Apr. 14, 2016, Matsuyuki et al.
U.S. Appl. No. 15/371,121, filed Dec. 6, 2016, Ely et al.
U.S. Appl. No. 15/611,329, filed Jun. 1, 2017, Ely et al.
Siqueira et al., "Poly(borosiloxanes) as Precursors for Carbon Fiber Ceramic Matrix Composites," http://www.scielo.br/scielo.php?script=sci_arttext&pid=S1516-14392007000200009, Materials Research, vol. 10, No. 2, São Carlos, Apr./Jun. 2007.

* cited by examiner

CERAMIC HAVING A RESIDUAL COMPRESSIVE STRESS FOR USE IN ELECTRONIC DEVICES

CROSS-REFERENCE TO RELATED APPLICATION(S)

This application is a nonprovisional patent application of and claims the benefit of U.S. Provisional Patent Application No. 62/234,783, filed Sep. 30, 2015 and titled "Ceramic Having a Residual Compressive Stress for Use in Electronic Devices," the disclosure of which is hereby incorporated herein by reference in its entirety.

FIELD

The disclosure relates generally to ceramic material and more particularly to components formed from toughened ceramic material having a residual compressive stress and methods of forming a residual compressive stress within the ceramic material.

BACKGROUND

Electronic devices typically include enclosures for protecting the internal components of the device. For example, a conventional electronic device may include a housing for containing the internal components of the electronic device, such as a display. Additionally, the display may be protected by a transparent cover glass. The housing and/or cover glass may prevent damage to the electronic device and its components when the electronic device undergoes an undesirable shock event (e.g., drop). The housing and cover glass may be formed from durable materials that may withstand these undesirable shock events.

However, while the durable material may protect the internal components, the enclosures (e.g., housing, cover glass) may be susceptible to damage. For example, when the electronic device is dropped, the housing and/or the cover glass may be scratched, dented, cracked, chipped and may suffer other material or surface defects. Where a material defect, such as a crack or dent, is formed in the enclosure, the material may be weakened and/or may be vulnerable to further damage, especially during subsequent, undesirable shock events. That is, the material defects may weaken the strength of the material, which may in turn reduce the enclosure's ability to protect the internal components of the electronic device. Additionally, in the instance where the enclosure (e.g., cover glass) is cracked, the crack may grow over time, which renders the electronic device partially or totally in operable.

Therefore, it is desirable to form the enclosure and/or the cover glass of the electronic device from a toughened material that both prevents material defects and mitigates or minimizes surface defects that may be formed in or on the enclosure and/or the cover glass.

SUMMARY

A ceramic component comprising an internal portion having a first coefficient of thermal expansion (CTE), and an external portion substantially surrounding the internal portion and forming an exterior surface of the ceramic component. The external portion has a second CTE less than the first CTE. Additionally, the external portion is in compressive stress.

A method for forming a toughened ceramic component. The method comprises applying, to an exterior surface of a ceramic substrate, a material having a first coefficient of thermal expansion (CTE) that is lower than a second CTE of the ceramic substrate, heating the material and the ceramic substrate, and in response to heating the material and the ceramic substrate, diffusing at least a portion of the material into an external portion of the ceramic substrate. The method also comprises cooling the material and the ceramic substrate thereby generating a compressive stress within the external portion of the ceramic substrate.

A method for forming a toughened ceramic component. The method comprises forming a preform comprising an internal portion formed from a first ceramic-based material having a first coefficient of thermal expansion (CTE), and an external portion positioned adjacent the internal portion. The external portion formed from a second ceramic-based material having a second CTE lower than the first CTE. The method also comprises sintering the preform to fuse the internal portion and the external portion to form a fused structure, and cooling the fused structure thereby forming a compressive stress within the external portion.

A method for forming a toughened ceramic component. The method comprises altering a first thermal expansion characteristic of an external portion of a ceramic preform while leaving a second thermal expansion characteristic of an internal portion of the ceramic preform unaltered. The method also comprises sintering the ceramic preform, cooling the ceramic preform, and forming a compressive stress within the external portion. The external portion of the ceramic preform is positioned adjacent the internal portion.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to ceramic material and more particularly to components formed from toughened ceramic material having a residual compressive stress and to methods of forming a residual compressive stress within the ceramic material.

In a particular embodiment, the toughed ceramic component includes a residual compressive stress formed therein. The compressive stress can be formed on an external portion of the ceramic component, which includes the exterior surface of the component. The compressive stress formed in the ceramic component improves physical characteristics (e.g., toughness, brittleness, and so on) of the ceramic component. Additionally, the compressive stress mitigates and/or prevents the spreading of surface defects (e.g., cracks, splits, breaks, chips and so on) that are formed in the ceramic component. Specifically, the compressive stress formed in the external portion of the ceramic component mitigates and/or prevents the spreading of surface defects formed in on exterior surface and/or within external portion of the ceramic component forming the exterior surface. The improved physical characteristics of the ceramic material are beneficial when the ceramic component is used in electronic devices, specifically handheld or wearable electronic devices that are susceptible to undesirable shock events (e.g., impacts).

These and other embodiments are discussed below with reference to FIGS. 1A-10. However, those skilled in the art will readily appreciate that the detailed description given herein with respect to these Figures is for explanatory purposes only and should not be construed as limiting.

Figure 1A:
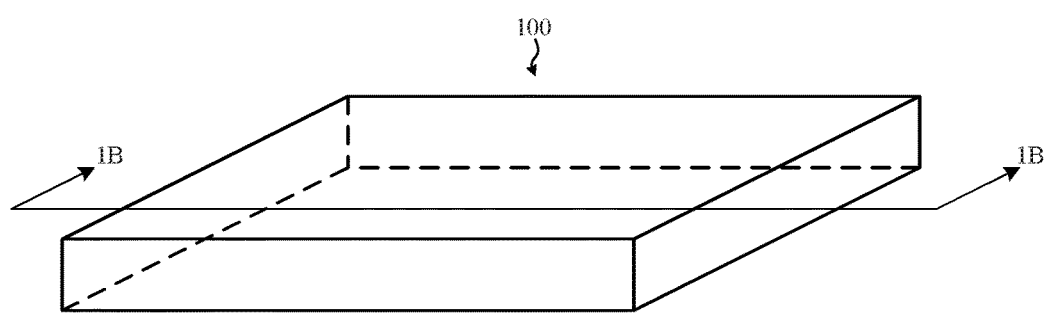
FIG. 1A shows a ceramic component.

FIG. 1A shows a toughened ceramic component or structure having a residual compressive stress formed in an external portion. Ceramic component 100 is shown in FIG. 1A as a sheet, but may take the form of any preform structure of ceramic material, for example, a wafer. As discussed herein, ceramic component 100 may take the form of a variety of components. In a non-limiting example, and as discussed herein, ceramic component 100 may be a cover positioned over a display of an electronic device (see, FIG. 10). Ceramic component 100 can be a single component that is in a final shape after undergoing the processes discussed herein.

Figure 1B:
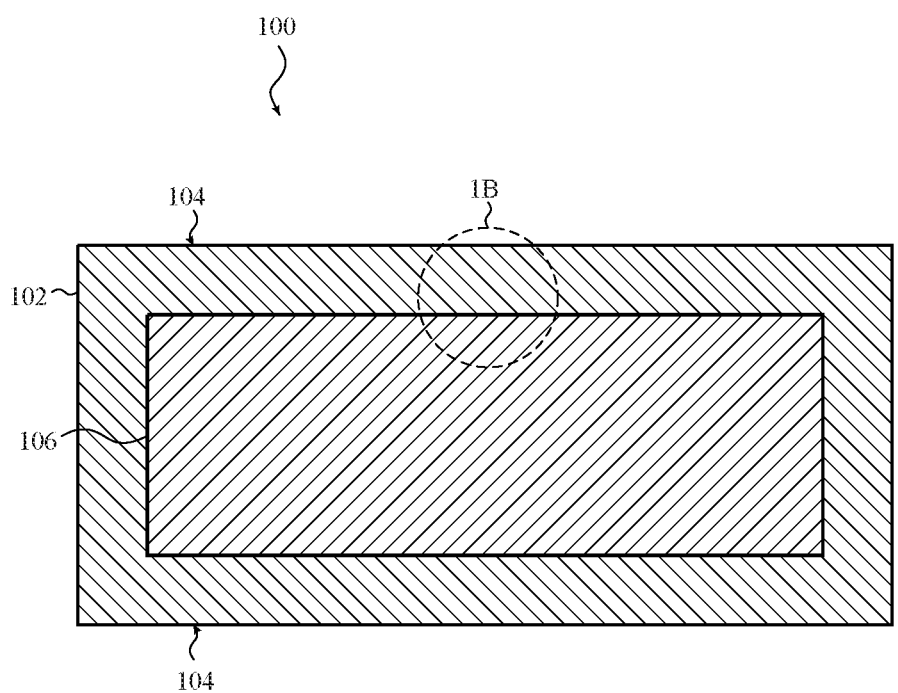
FIG. 1B shows a side cross-section view of the ceramic component of FIG. 1A taken along line 1B-1B having an external portion and an internal portion.

FIG. 1B shows a side cross-section view of toughened ceramic component 100. Forming the residual compressive stress in external portion 102 of ceramic component 100 improves the strength of the material forming ceramic component 100 when compared to untreated and/or unprocessed ceramic material, which typically is brittle and susceptible to cracking. Additionally, toughened ceramic component 100) having a residual compressive stress formed in external portion 102) may have improved toughness, brittleness and/or improves protection against damage as compared to a conventional ceramic component 100. The residual compressive stress formed in external portion 102 also mitigates and/or prevents the spreading of surface defects (e.g., cracks, splits, breaks, chips and so on) that are formed in ceramic component 100 and specifically on an exterior surface 104 and/or within external portion 102. In a non-limiting example, the external portion 102 having the residual compressive stress prevents surface defects from spreading within external portion 102 and/or spreading to internal portion 106 of ceramic component 100.

The improved physical characteristics for ceramic component 100 are crucial for certain utilizations of ceramic component 100. As discussed herein, toughened ceramic component 100 may take the form of a variety of components. In non-limiting examples, and as discussed herein, toughened ceramic component 100 may form a cover positioned over a display of an electronic device and/or may form an enclosure or housing for the electronic device. The improved physical characteristics, such as improved strength and crack propagation, allow the electronic device to withstand more day-to-day wear, such as shock or drop events, without becoming damaged, cracked and/or broken. As a result, and according to the example discussed herein, ceramic component 100 can improve the operational life of the electronic device.

Ceramic component 100, as shown in FIG. 1B, is formed as a single structure or component. As discussed herein, although ceramic component 100 is shown to have external portion 102 and internal portion 106, each having distinct cross-hatching in FIG. 1B, it is understood that external portion 102 and internal portion 106 are a single structure. However, in another non-limiting example, external portion 102 and internal portion 106 may be distinct components and/or may be separated from one another.

Ceramic component 100 is formed from any suitable crystalline structure or structures. Additionally, ceramic component 100 is formed from any suitable ceramic material(s) that is capable of undergoing the processes discussed herein to form a residual compressive stress in external portion 102 of ceramic component 100. In non-limiting examples, ceramic component 100 is formed from, but not limited to, zirconia, alumina ($Al_2O_3$), commonly known as sapphire, silicon carbide, silicon nitride and other crystalline ceramic materials having substantially similar characteristics as the specific materials discussed herein.

As shown in FIG. 1B, external portion 102 of ceramic component 100 substantially surrounds internal portion 106. Also shown in FIG. 1B, external portion 102 surrounds all portions of internal portion 106 and forms exterior surface 104 of ceramic component 100. External portion 102 and internal portion 106 are under and/or experience distinct stresses when forming ceramic component 100. In a non-limiting example, and as discussed herein, at least a portion of external portion 102 is under a residual compressive stress and at least a portion of internal portion 106 is under a tensile stress. In some embodiments, external portion 102 may not fully surround internal portion 106, but rather may only be formed adjacent a top and bottom surface, for example.

In addition to experiencing distinct stresses, other properties and/or characteristics of external portion 102 and internal portion 106 of ceramic component 100 may be distinct. In a non-limiting example, the coefficient of thermal expansion (CTE) is distinct or different for external portion 102 when compared to the CTE for internal portion 106. In the non-limiting example, the CTE for external portion 102 is less than the CTE for internal portion 106. As a result, external portion 102 of ceramic component 100 may expand and/or contract less than internal portion 106 when ceramic component 100 is heated and/or cooled, respectively. As discussed herein, the distinction and/or difference in the CTEs for external portion 102 and internal portion 106 substantially impacts the compressive stress formed in external portion 102 and, when applicable, the tensile stress formed in internal portion 106 of ceramic component 100.

The distinction or difference between the CTEs for external portion 102 and internal portion 106 are a result of a distinction or difference between the material composition and/or properties of external portion 102 and the material composition and/or properties for internal portion 106. That is, the material composition and/or properties of external portion 102 are distinct or different than the material composition and/or properties for internal portion 106 of ceramic component 100. In a non-limiting example, and as discussed in detail with respect to FIG. 1C, internal portion 106 has a pure-ceramic material composition (e.g., zirconia), while external portion 102 has a doped-ceramic material composition (e.g., zirconium(IV) oxide-yttria). External portion 102 and internal portion 106 may still form a unitary structure. For example, the materials can be co-sintered or otherwise process to form a single structure. In some embodiments, there may be no visible seam or other separation between internal portion 106 and external portion 102.

Figure 1C:
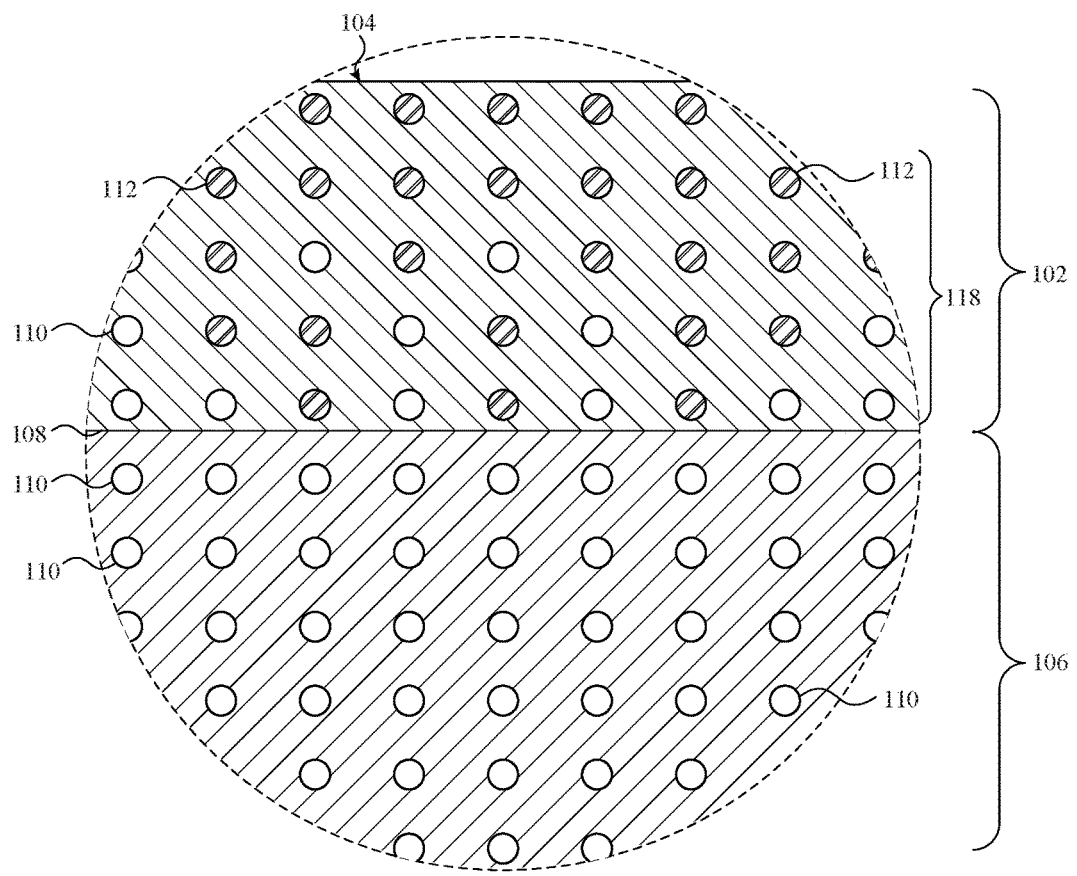
FIG. 1C shows an enlarged portion of the ceramic component of FIG. 1B.

FIG. 1C shows an enlarged region of ceramic component 100 of FIG. 1B. Specifically, FIG. 1C shows part of external portion 102 and internal portion 106 separated by transition line 108. In a non-limiting example where external portion 102 and internal portion 106 are formed as a single structure, transition line 108 is merely a reference line that distinguishes the external portion 102 and internal portion 106. In the non-limiting example, transition line 108 more easily identifies where internal portion 106 having a first CTE and/or material composition ends and where external portion 102 having a second CTE and/or material composition begins. In another non-limiting example where external portion 102 and internal portion 106 are formed as distinct layers or structures, transition line 108 indicates a separation or interface between the layers or materials that form external portion 102 and internal portion 106.

As discussed herein, in some embodiments, external portion 102 and internal portion 106 are parts of a single ceramic component 100 and share a common base material. Both external portion 102 and internal portion 106 include a common ceramic material. As shown in FIG. 1C, external portion 102 and internal portion 106 are formed from the same ceramic material, which is shown or indicated by the ceramic material or atoms 110 positioned within external portion 102 and internal portion 106. In a non-limiting example, ceramic component 100 and, specifically, external portion 102 and internal portion 106 are formed from zirconia material.

The term "atoms" refers to the particles of matter that make up the material of ceramic component 100. Atoms may generally, and indiscriminately, refer to the atoms that make up and/or form the entire material of ceramic component 100 and, specifically, external portion 102 and/or internal portion 106. In a non-limiting example where ceramic component 100 is formed from zirconia or zirconium dioxide, atoms may be used as a general description and may refer to the atoms of all elements (e.g., zirconium and oxygen) of the zirconia indiscriminately, as well as the zirconia itself. As such, and as described herein, ceramic atoms 110 may be any atoms associated with any of the various elements that form zirconia. In another non-limiting example, ceramic atoms 110 may be multiple atoms of different elements that form the material (e.g., zirconia) of ceramic component 100. The term "atom," as used herein, may encompass an ion and/or a molecule of the material, as appropriate.

As shown in FIG. 1C, external portion 102 also includes a distinct atom positioned therein. Specifically, in addition to ceramic atoms 110 forming at least a portion of external portion 102, external portion 102 also includes a dopant material. The dopant material is shown or indicated in FIG. 1C by dopant material or atoms 112 positioned within external portion 102. As shown in FIG. 1C, dopant atoms 112 are only formed within external portion 102 and are not formed within internal portion 106. As such, transition line 108 marks a (possibly invisible) boundary between external portion 102 formed from the doped-ceramic material, and internal portion 106 formed from only the ceramic material.

The size, orientation, and/or spacing of dopant atoms 110, 112 of ceramic component 100, as shown in FIG. 1C, and additional figures discussed herein, are merely exemplary. That is, the atoms depicted in the figures are not limited to the size, orientation and/or spacing as shown. Rather, the atoms are merely sized, oriented and/or spaced as an example and/or for clarifying the material properties of ceramic component 100 and the changes the material forming ceramic component 100 experiences when undergoing the processes discussed herein.

The dopant material may be any suitable dopant material having a coefficient of thermal expansion (CTE) that is less than the CTE of the ceramic material (e.g., ceramic atoms 110) forming ceramic component 100 and, specifically, external portion 102 of ceramic component 100. In non-limiting examples, dopant material (e.g., dopant atoms 112) included within external portion 102 may include, but is not limited to, yttria or yttrium, silicon, germanium, chromium and other dopant materials that may be implanted within crystalline ceramic materials to lower the CTE of the ceramic material. The lowering of the CTE of external portion 102 (when compared to the CTE of internal portion 106) results in a compressive stress being formed in external portion 102 when ceramic component 100 undergoes certain formation processes discussed herein.

As a result of embedding dopant atoms 112 within external portion 102, the material composition and/or properties of external portion 102 differ from the material composition and/or properties of internal portion 106. In the non-limiting example shown in FIG. 1C, internal portion 106 is entirely composed of ceramic atoms 110 and, as such, is purely a ceramic material. In the non-limiting example, internal portion 106 is composed of zirconia or zirconium dioxide. Additionally, in the non-limiting example shown in FIG. 1C, external portion 102 is composed of the base ceramic atoms 110 and dopant atoms 112. As a result, external portion 102 is a doped ceramic material, for example, zirconium(IV) oxide-yttria.

As a result of the different material compositions between external portion 102 (e.g., zirconium(IV) oxide-yttria) and internal portion 106 (e.g., zirconium dioxide), the CTEs for each of external portion 102 and internal portion 106 are also distinct or different, as discussed herein. In the non-limiting example, the external portion 102 formed from zirconium (IV) oxide-yttria has a lower CTE than internal portion formed from zirconia or zirconium dioxide. The difference in CTE and, specifically, external portion 102 having a lower CTE than internal portion 106, creates a compressive stress within external portion 102 when forming ceramic component 100 using the process discussed in detail below. The compressive stress formed in external portion 102 may improve toughness, reduce brittleness and/or other improve resistance to damage of the ceramic component 100, as well as mitigate propagation of surface defects (e.g., cracks, splits, breaks, chips and so on) in ceramic component 100.

As shown in FIG. 1C, a concentration of the dopant atoms 112 varies within external portion 102 of ceramic component 100. That is, external portion 102 includes a gradient 118 of dopant atoms 112. In a non-limiting example shown in FIG. 1C, the concentration of dopant atoms 112 is highest adjacent exterior surface 104 of ceramic component 100. Additionally, the concentration of dopant atoms 112 is lowest adjacent internal portion 106 and/or transition line 108. Also shown in the non-limiting example of FIG. 1C, the concentration of dopant atoms 112 formed in external portion 102 gradually decreases from exterior surface 104 to internal portion 106 and/or transition line 108. Gradient 118 of dopant atoms 112 formed in external portion 102 is a result of the doping and/or diffusion processes undergone when forming ceramic component 100, as discussed herein.

Figure 2:
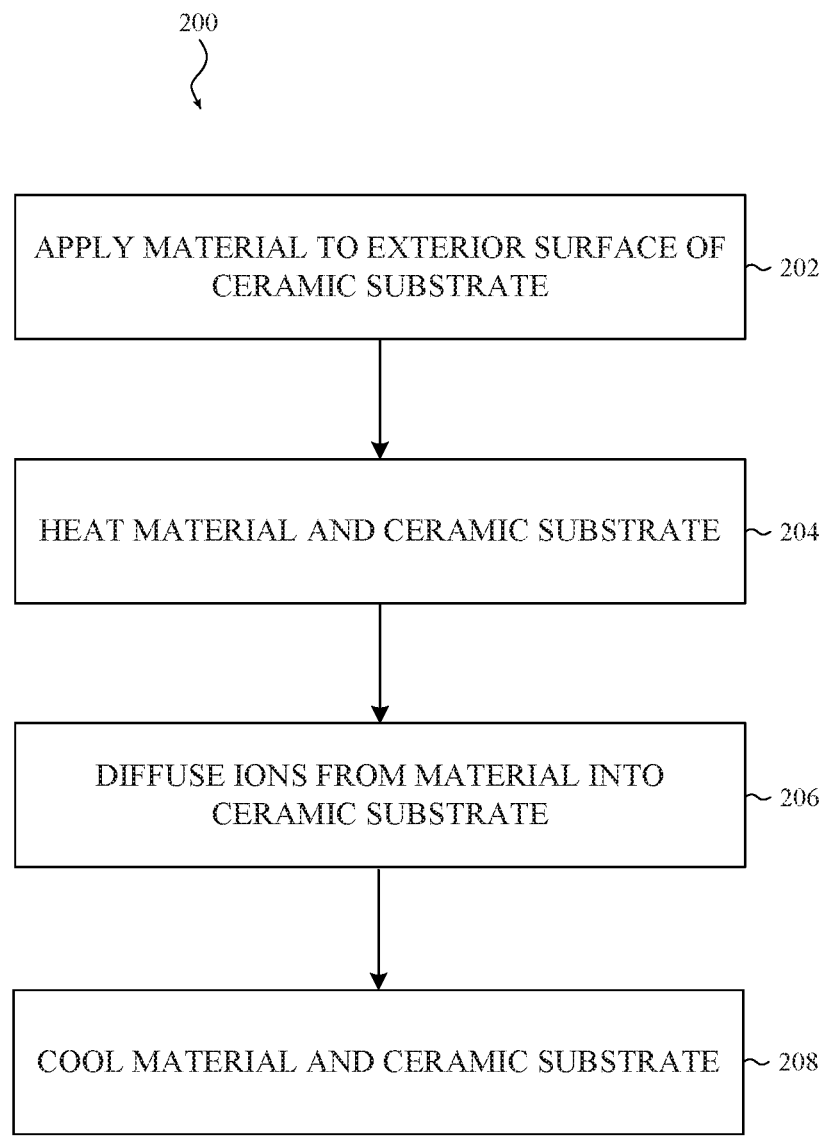
FIG. 2 shows a flow chart of an example process for forming a toughened ceramic component.

FIG. 2 depicts an example process for forming a toughened ceramic component. Specifically, FIG. 2 is a flowchart depicting one example process 200 for forming a toughened ceramic component having a residual compressive stress formed within an external portion to improve physical characteristics (e.g., toughness, brittleness, and so on) of the ceramic component. In some cases, the toughened ceramic component may be utilized in an electronic device, as discussed below with respect to FIG. 10.

In operation 202, a material is applied to an exterior surface of a ceramic material or substrate. The material applied to the exterior surface has a coefficient of thermal expansion (CTE) lower than a CTE for the ceramic material or substrate. Additionally, the material applied to the exterior surface is a dopant material. As such, applying the material also can include doping the exterior surface of the ceramic substrate.

Applying the material to the exterior surface of the ceramic substrate can be performed by a variety of material application processes. In non-limiting examples, applying the material can be done by any or all of dip coating the ceramic substrate in the material, painting the material on the ceramic substrate, tape casting at least one layer of the material on the ceramic substrate, applying a slurry of the material to the ceramic substrate, and chemical vapor depositing (CVD) the material over the ceramic substrate.

In operation 204, the ceramic substrate is heated. In this operation, the material applied to the exterior surface of the ceramic substrate in operation 202 and the ceramic substrate are heated together. The material and the ceramic substrate are heated to a predetermined temperature and/or for a predetermined time to cause diffusion between the material and the ceramic substrate, as discussed in detail with respect to operation 206. The predetermined temperature and/or predetermined heating time is dependent on, at least in part, the material composition of the ceramic substrate and the material applied to the exterior surface of the ceramic substrate. The material and the ceramic substrate are heated using any suitable heating process and/or heating system including, but not limited to, a laser, a flash-lamp, and a furnace or an oven.

Heating the ceramic substrate typically expands ceramic substrate. As the ceramic substrate is heated to the predetermined temperature to cause diffusion, as discussed herein, the ceramic substrate also expands. The entire ceramic substrate expands evenly during the heating process, as the ceramic substrate is a uniform, ceramic material.

In operation 206, atoms, ions, molecules or other portions of the material applied to the exterior surface are diffused into an external portion of the ceramic substrate. The external portion of the ceramic substrate surrounds an internal portion of the ceramic substrate. Diffusion occurs as a result of heating the material and the ceramic substrate in operation 204. That is, once the ceramic substrate is heated to the predetermined temperature and/or heated for the predetermined time, some of the material applied to the exterior surface is diffused within the external portion of the ceramic substrate. Diffusion occurs while the material and the ceramic substrate are being heated and/or are maintained at the predetermined temperature. Material is diffused within the external portion of the ceramic substrate, such that the internal portion is substantially free from atoms from the material applied to the exterior surface and/or the material composition of the internal portion remains an undoped, ceramic material.

The diffusing operation also occurs in the external portion of the ceramic substrate with atoms of the material. That is, during the diffusion process in operation 206, atoms from the material applied to the exterior surface of the ceramic substrate replace atoms of the ceramic material of the external portion. The replaced ceramic atoms may diffuse and/or migrate to the material, such that an exchange between the two materials occurs. Where the material is a dopant, the material application and diffusion processes are, collectively, commonly referred to as a doping process.

The replacing of the atoms in the external portion of the ceramic substrate also includes exchanging or replacing a first number of the ceramic atoms of the external portion directly adjacent the exterior surface of the ceramic substrate and exchanging or replacing a second number of the ceramic atoms of the external portion directly adjacent the internal portion of the ceramic substrate. The second number of the ceramic atoms may be less than the first number of the ceramic atoms. As a result, a gradient of the material diffused into the external portion is formed within the ceramic substrate. Specifically, the replacing of the atoms in the external portion also includes forming a gradient of the atoms of the material diffused into the external portion. The gradient includes a first concentration of the atoms of the material adjacent the exterior surface and a second concentration of the atoms of the material adjacent the internal portion. The second concentration of the atoms of the material is smaller than the first concentration of the atoms of the material. Additionally, the concentration of the atoms of the material gradually decreases when moving from the exterior surface of the ceramic substrate to the internal portion of the ceramic substrate.

The diffusion achieved in operation 206 also includes altering the material composition and/or thermal expansion characteristics for the external portion of the ceramic substrate. That is, diffusing and/or replacing ceramic atoms in the external portion with the atoms of the material applied to the exterior surface substantially alters the material composition and/or the thermal expansion characteristics of the external portion. Prior to diffusing the atoms of the material into the external portion, the external portion and the internal portion of the ceramic substrate both have the same material composition. However, subsequent to performing the diffusion process in operation 206, the external portion includes both ceramic atoms and atoms of the material. As discussed herein with respect to operation 202, the material can include a dopant material having a CTE lower than the CTE of the ceramic material forming the ceramic substrate. As a result, the atoms of the material diffused into the external portion cause the external portion to be formed from a doped, ceramic material, with a lower CTE than the undoped, ceramic material forming the internal portion of the ceramic substrate.

In operation 208, the material and the ceramic substrate are cooled. That is, subsequent to the heating in operation 204 and the diffusion in operation 206, the ceramic substrate heated to the predetermined diffusion temperature is cooled. Both the ceramic substrate, including the external portion and the internal portion, and the material applied to the exterior surface of the ceramic substrate are cooled to lower the temperature of the ceramic substrate. Cooling the ceramic substrate can include gradually and/or naturally cooling the ceramic substrate by removing the ceramic substrate from the heating system and/or heating device. Alternatively, the ceramic substrate can be rapidly cooled by removing the ceramic substrate from the heating system and submerging the ceramic substrate into a cold-liquid bath, or spraying the ceramic substrate with a cold or cooled liquid.

Cooling the ceramic substrate also shrinks the ceramic substrate. Specifically, the cooling of the heated ceramic substrate causes the external portion and the internal portion of the ceramic substrate to shrink. Distinct from the heating process where ceramic substrate expands evenly and uniformly, in the cooling process the ceramic substrate shrinks unevenly. The external portion and the internal portion of the ceramic substrate shrink at different rates and/or shrink different amounts or distances. This is a result of the change in the material composition and the change in the CTE for the external portion during the diffusion process in operation 206. As such, when the heated ceramic substrate cools, the external portion having the lower CTE shrinks less and/or slower than the internal portion having the higher CTE.

As a result of cooling the ceramic substrate, a compressive stress is formed or generated within the external portion of the ceramic substrate. The compressive stress is formed within the external portion as a result of the lower CTE for the external portion and because the external portion shrinks less than the internal portion of the ceramic substrate. Specifically, the cooling of the heated ceramic substrate and the resulting shrinkage of the distinct portions of the ceramic substrate forms a compressive stress within the external portion of the ceramic substrate. The compressive stress formed in the external portion of the ceramic substrate improves the strength of the ceramic substrate when compared to untreated and/or unprocessed ceramic materials. Additionally, compressive stress formed in the external portion of the ceramic substrate improves (e.g., increases, decreases) the toughness, brittleness and/or improves protection against damage to the ceramic substrate. Furthermore, the compressive stress formed in the external portion also mitigates and/or prevents the spreading of surface defects (e.g., cracks, splits, breaks, chips and so on) within the ceramic substrate and specifically through external portion and/or within the internal portion of the ceramic substrate.

Although not shown, process 200 for forming a toughened ceramic component can include additional processes. In a non-limiting example, the process 200 can also include forming or generating a tensile stress within the internal portion of the ceramic substrate. Similar to the formation of the compressive stress within the external portion, the tensile stress formed within the internal portion of the ceramic substrate is a result of the cooling of the heated ceramic substrate. Specifically, the tensile stress is formed within the internal portion as a result of the higher CTE for the internal portion and because the internal portion shrinks more than the external portion of the ceramic substrate. Additionally, the tensile stress is formed within the internal portion as a result of the external portion shrinking around the internal portion and/or a compressive stress being formed within the external portion, which substantially surrounds the internal portion.

In another non-limiting example, the ceramic substrate can undergo a material removal process subsequent to forming the compressive stress within the external portion of the ceramic substrate. For example, after forming the compressive stress within the external portion, the ceramic substrate may still include a layer of the material applied to and/or formed on the exterior surface. As such, a material removal process is performed on the ceramic substrate to remove any of the material applied in operation 202 remaining on the exterior surface.

In other non-limiting examples, the process 200 can include performing various material finishing processes on the ceramic substrate prior to applying the material to the exterior surface of the ceramic substrate in operation 202. One non-limiting example includes sintering the ceramic substrate prior to applying the material to the exterior surface of the ceramic substrate. The ceramic substrate is sintered to ensure the material forming the ceramic substrate is not in a preform or "green body" (e.g., unsintered ceramic item), but rather in a finalized, sintered state, ready to undergo the operations of process 200. In other non-limiting examples, the ceramic substrate can undergo cutting, grinding, shaping, and/or polishing processes prior to applying the material to the exterior surface of the ceramic substrate.

FIGS. 3A-3G show side and enlarged cross-section views, of a ceramic substrate 320 undergoing the example process 200 for forming a toughened ceramic component 300 (see, FIG. 3G) as discussed herein with respect to FIG. 2. It is understood that similarly numbered and/or named components may function in a substantially similar fashion. Redundant explanation of these components has been omitted for clarity.

Figure 3A:
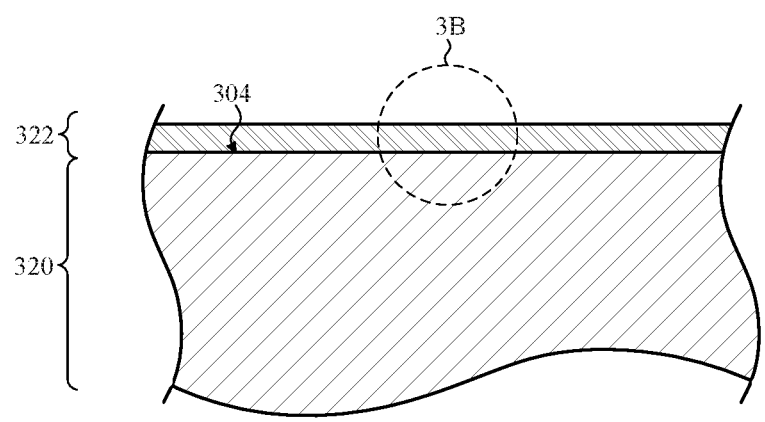
FIG. 3A shows a side cross-section view of a portion of a ceramic substrate covered with a dopant material.

FIG. 3A shows a side cross-section view of ceramic substrate 320. Ceramic substrate 320 is any suitable ceramic material discussed herein. As shown in FIG. 3A, the material composition of ceramic substrate 320 is uniform throughout the substrate when performing the initial processes discussed herein for forming ceramic component 300 (see, FIG. 3G). Additionally, ceramic substrate 320 is a pre-fired and/or sintered substrate of ceramic material. As a result, and as discussed herein, the processes discussed herein with respect to FIGS. 3A-3G are performed on ceramic substrate which is pre-sintered and not in a green body.

Additionally shown in FIG. 3A, a material 322 is applied to exterior surface 304 of ceramic substrate 320. Specifically, a layer of dopant material 322 is applied to the entire exterior surface 304 of ceramic substrate 320. The dopant material 322 includes any suitable dopant material discussed herein, such as yttria or yttrium, silicon, germanium, chromium, and so on. Additionally, and as discussed herein, dopant material 322 is made from a material having a coefficient of thermal expansion (CTE) that is less than the CTE of the material forming ceramic substrate 320.

Dopant material 322 can be applied to ceramic substrate 320 using various material application techniques. In a non-limiting example, ceramic substrate 320 can be dipped into a substantially liquid-state of dopant material 322 such that ceramic substrate 320 is dip coated, and/or dopant material 322 covers exterior surface 304 of ceramic substrate 320. In other non-limiting examples, a layer or layers of dopant material 322 can be painted and/or taped casted on exterior surface 304 of ceramic substrate 320. In another non-limiting example, a slurry of dopant material 322 can be applied and/or disposed over exterior surface 304 of ceramic substrate 320. Finally, dopant material 322 can be applied to ceramic substrate 320 using a chemical vapor deposition (CVD) process. The process used to apply dopant material 322 is dependent on, at least in part, the material composition of ceramic substrate 320, the material composition of dopant material 322, the desired residual compressive stress to be formed within ceramic substrate 320 when forming toughened ceramic component 300 and so on.

Figure 3B:
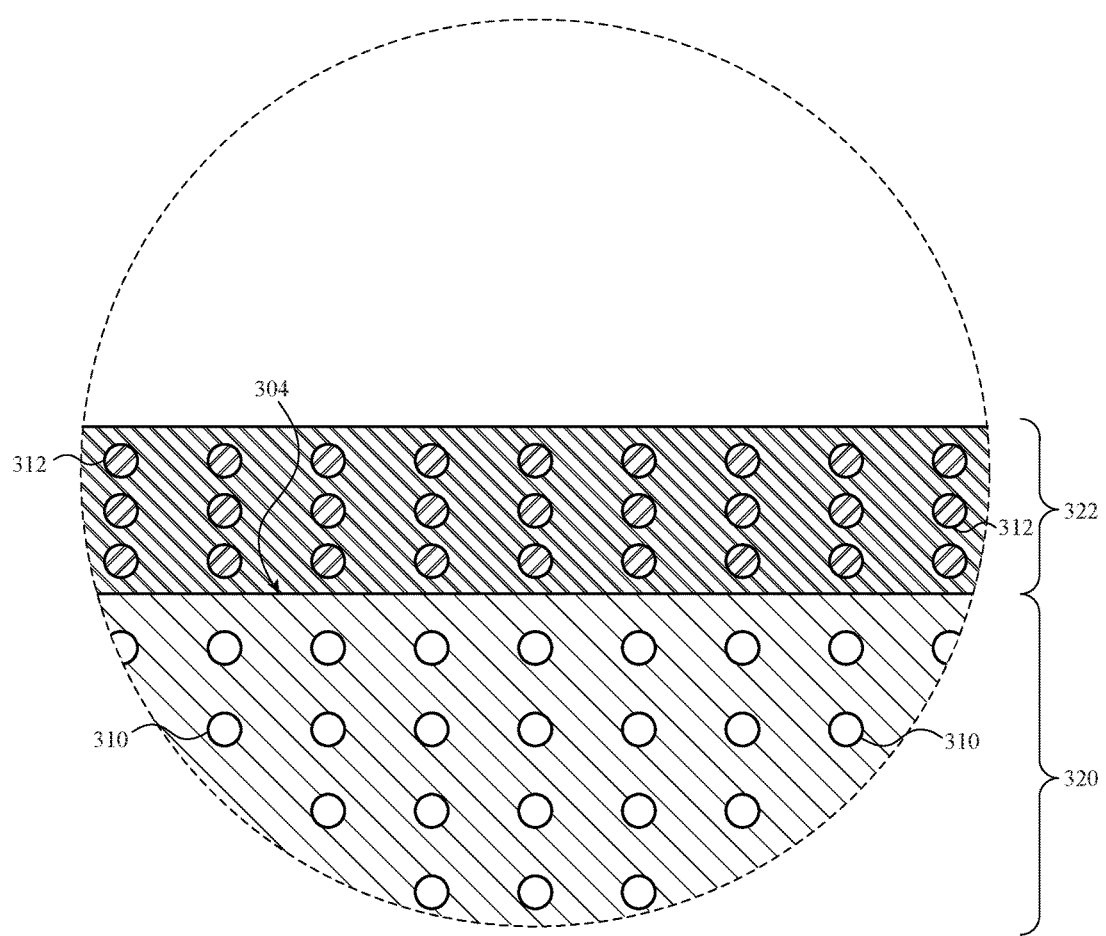
FIG. 3B shows an enlarged view of the portion of the ceramic substrate covered with the dopant material of FIG. 3A.

FIG. 3B shows an enlarged portion of ceramic substrate 320 and dopant material 322, as depicted in FIG. 3A. As shown in FIG. 3B, and discussed herein with respect to FIG. 1C, each of ceramic substrate 320 and dopant material 322 are depicted to include atoms, which represent the particles of matter that make up the material of ceramic substrate 320 and dopant material 322, respectively. In the non-limiting example, ceramic substrate 320 is made up of ceramic atoms 310, and dopant material 322 is made of dopant atoms 312. Each particle or atom of the dopant material is contained within the ceramic material, and no material or atoms have been exchanged. As shown in FIG. 3B, subsequent to dopant material 322 being applied to exterior surface 304, the respective atoms (e.g., ceramic atoms 310, dopant atoms 312) for each of ceramic substrate 320 and dopant material 322 is only included within its corresponding material and/or substrate. As a result, ceramic atoms 310 of ceramic substrate 320 have not been exchanged with dopant atoms 312 of dopant material 322, and vice versa.

The processes performed on ceramic substrate 320, as shown and discussed herein with respect to FIGS. 3A and 3B, may correspond to operation 202 of the process 200 shown in FIG. 2.

Figure 3C:
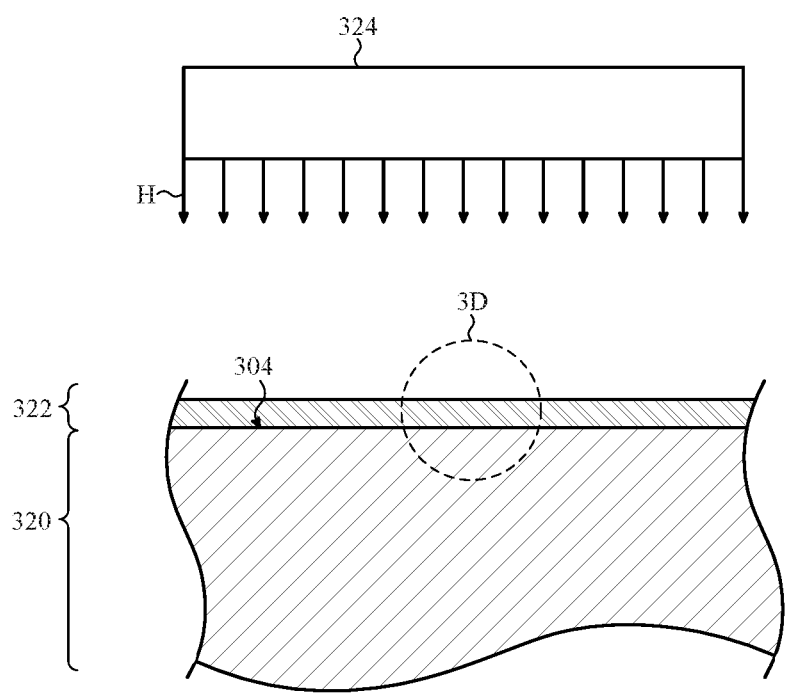
FIG. 3C shows a side cross-section view of the portion of the ceramic substrate, the dopant material of FIG. 3A undergoing a heating process.

FIG. 3C shows a heating device 324 positioned adjacent ceramic substrate 320 and dopant material 322. Specifically, heating device 324 and ceramic substrate 320 are positioned adjacent and/or proximate one another, such that heating device 324 can provide heat (H) to ceramic substrate 320 and dopant material 322 thereon. Heating device 324 is configured to heat ceramic substrate 320 and dopant material 322 to a predetermined diffusion temperature. In a non-limiting example, heating device 324 is configured as a heat or flash lamp that can be positioned adjacent exterior surface 304 of ceramic substrate 320 and/or dopant material 322 and provides heating means to heat ceramic substrate 320 and dopant material 322. In other non-limiting examples, heating device 324 can be any suitable heating system or component configured to heat ceramic substrate 320 and dopant material 322 during the processes discussed herein, including a laser, a furnace or an oven, and so on.

Figure 3D:
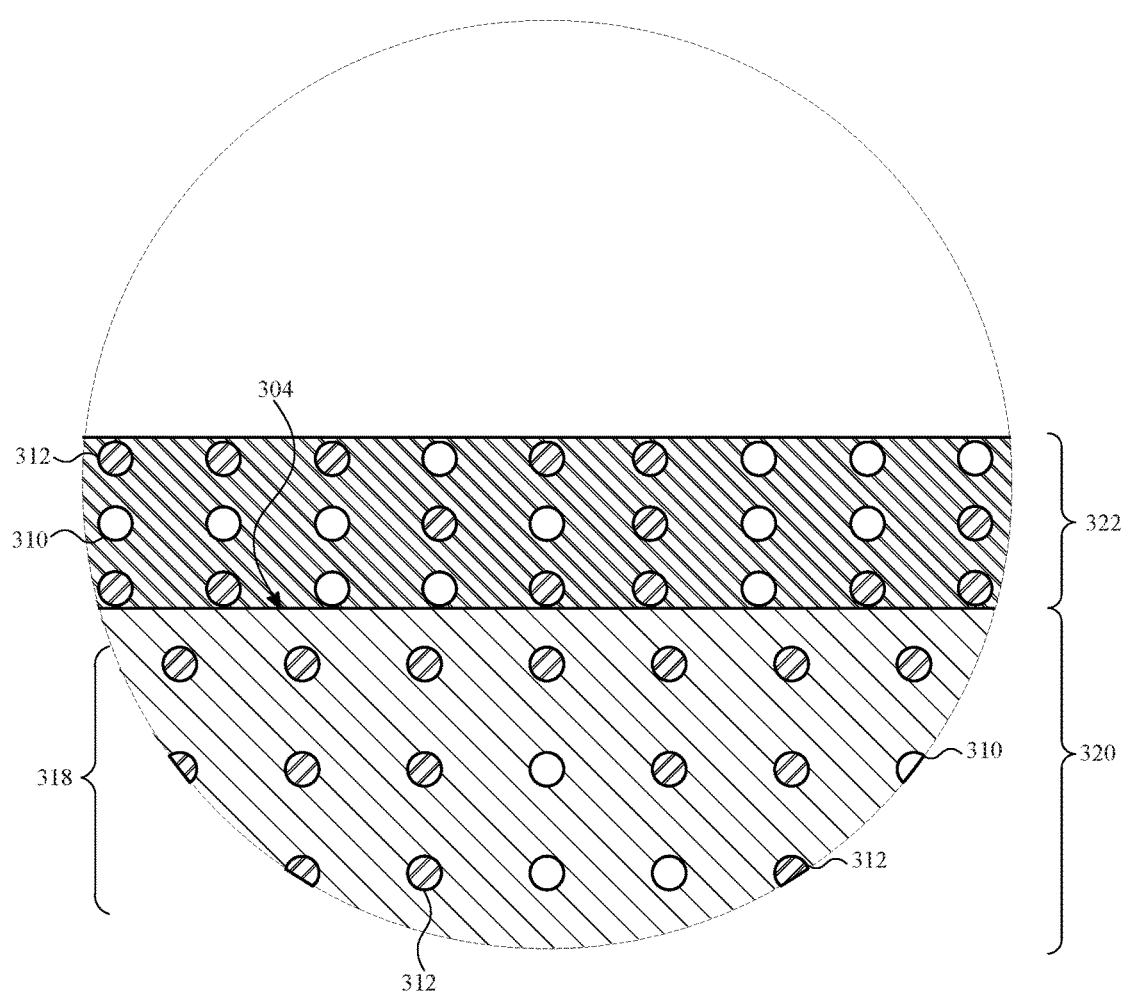
FIG. 3D shows an enlarged view of the portion of the ceramic substrate covered with the dopant material of FIG. 3C.

Turning to FIG. 3D, the effects of heating ceramic substrate 320 and dopant material 322 are more clearly shown. In the non-limiting example shown in FIG. 3D, and in conjunction with and/or in response to heating ceramic substrate 320 and dopant material 322, dopant atoms 312 of dopant material 322 are diffused into ceramic substrate 320. Specifically, when ceramic substrate 320 and dopant material 322 are heated to the predetermined diffusion temperature, an exchange of atoms 310, 312 between ceramic substrate 320 and dopant material 322 occurs. In a non-limiting example shown in FIG. 3D, dopant atoms 312 of dopant material 322 diffuse into ceramic substrate 320 and/or replace ceramic atoms 310 of ceramic substrate 320. In addition, ceramic atoms 310 that are replaced by dopant atoms 312 migrate toward and/or into dopant material 322 and take the place of dopant atoms 312 that are diffused into ceramic substrate 320.

A concentration of dopant material 322 and/or dopant atoms 312 varies within ceramic substrate 320. As shown in FIG. 3D, ceramic substrate 320 includes gradient 318 of dopant atoms 312. In a non-limiting example, and as discussed herein with respect to FIG. 1C, the concentration of dopant atoms 312 is highest adjacent exterior surface 304 of ceramic substrate 320. Additionally, the concentration of dopant atoms 312 formed in ceramic substrate 320 gradually decreases as dopant atoms 312 diffuse further into ceramic substrate 320 from exterior surface 304.

Additionally, in conjunction with and/or in response to heating ceramic substrate 320 and dopant material 322, ceramic substrate 320 and dopant material 322 expand. As shown in FIG. 3D, and with comparison to FIG. 3B, ceramic atoms 310 of ceramic substrate 320 and dopant atoms 312 of dopant material 322 move and/or spread out, resulting in the expansion of ceramic substrate 320 and dopant material 322, respectively. In a non-limiting example, ceramic substrate 320 and corresponding ceramic atoms 310 expand more than and/or a greater distance than dopant material 322 and corresponding dopant atoms 312. The difference in expansion is a result of difference in coefficients of thermal expansion (CTE) for ceramic substrate 320 and dopant material 322. Specifically, because ceramic substrate 320 has a higher CTE than dopant material 322, ceramic substrate 320 expands more than dopant material 322 when ceramic substrate 320 and dopant material 322 are heated by heating device 324.

The processes performed on ceramic substrate 320, as shown and discussed herein with respect to FIGS. 3C and 3D, may correspond to operations 204 and 206 of the process 200 shown in FIG. 2.

Figure 3E:
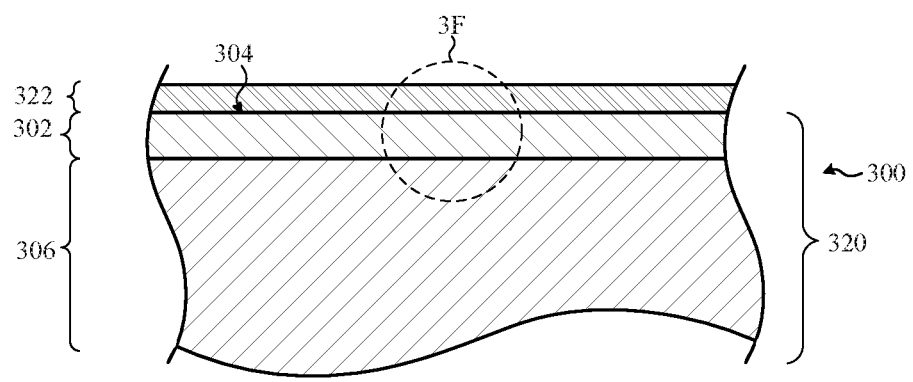
FIG. 3E shows a side cross-section view of the portion of the ceramic substrate, the dopant material of FIG. 3A undergoing a cooling process.

FIG. 3E shows ceramic substrate 320 and dopant material 322 subsequent to being cooled. Specifically, after ceramic substrate 320 and dopant material 322 are heated to the predetermined diffusion temperature and diffusion occurs between ceramic substrate 320 and dopant material 322 as discussed herein with respect to FIGS. 3C and 3D, ceramic substrate 320 and dopant material 322 are cooled. The cooling of ceramic substrate 320 results in the formation of ceramic component 300. In a non-limiting example shown in FIG. 3E, ceramic substrate 320 is cooled to form ceramic component 300 (including internal portion 306 and external portion 302).

Ceramic component 300 and dopant material 322 are cooled to a predetermined temperature, for example room temperature. In a non-limiting example, ceramic component 300 and dopant material 322 can be cooled naturally or organically by removing heat supplied by heating device 324 (see, FIG. 3C). Alternatively, ceramic component 300 and dopant material 322 can be rapidly cooled by submerging the materials in a bath of cold liquid, sprayed by cold liquid and the like.

Figure 3F:
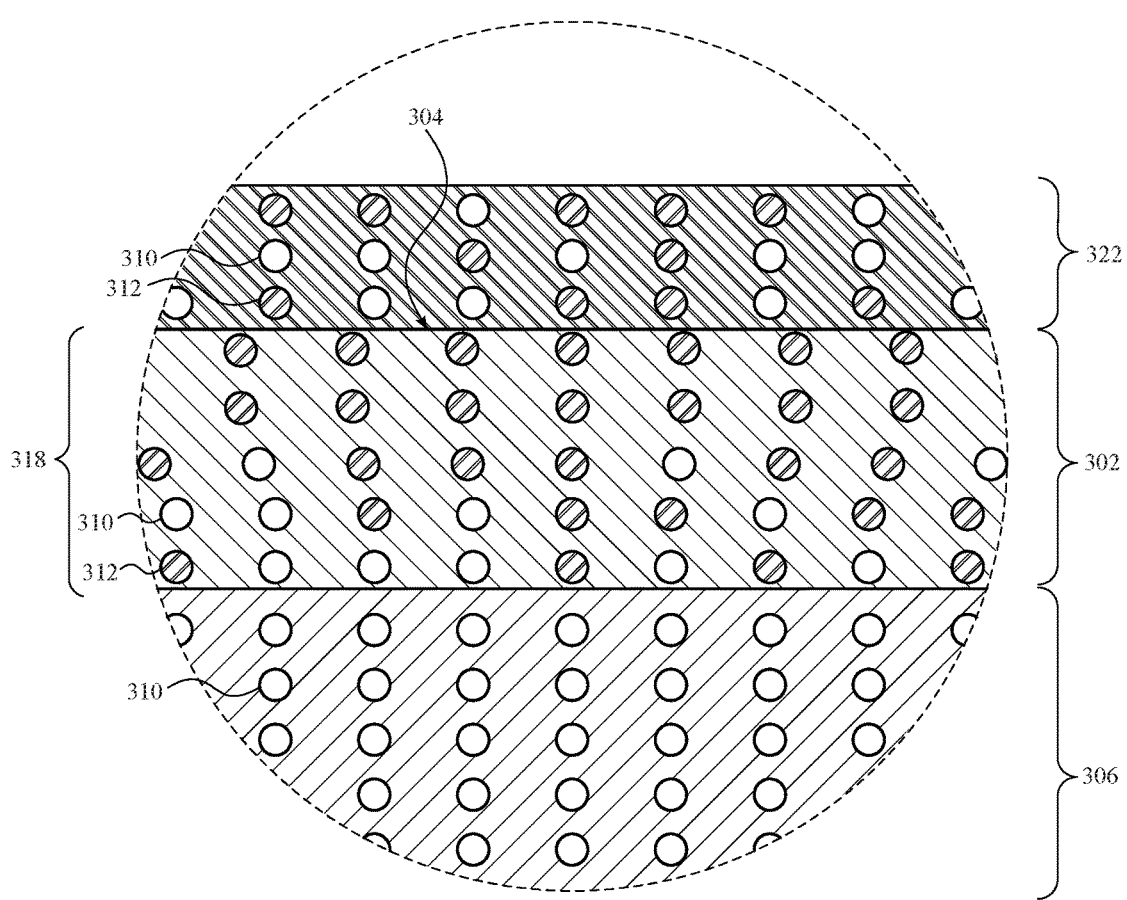
FIG. 3F shows an enlarged view of the portion of the ceramic substrate covered with the dopant material of FIG. 3E.

The cooling of ceramic component 300 and the formation of internal portion 306 and external portion 302 of ceramic component 300 is a result of the shrinkage and/or contraction of ceramic component 300. Turning to FIG. 3F, ceramic component 300 shrinks and/or contracts when cooled after undergoing heating and diffusion processes. The shrinkage and/or contraction of ceramic component 300 is shown with respect to positioning of ceramic atoms 310 and dopant atoms 312. In a non-limiting example shown in FIG. 3F, and with comparison to FIG. 3D, the ceramic atoms 310 and dopant atoms 312 of ceramic component 300 shrink and/or contract from the expanded position during heating and/or diffusion (see, FIG. 3D).

Ceramic component 300 contracts and/or shrinks a different amount or distance, and/or at a different rate. Specifically, the distinct portions of ceramic component 300, external portion 302 and internal portion 306, shrink different amounts or distances and/or at different rates when compared to one another. The shrinkage or contraction amount, distance, and/or rate is dependent on the CTE for each external portion 302 and internal portion 306 of ceramic component 300.

In a non-limiting example shown in FIG. 3F, internal portion 306 is free of dopant atoms 312 and is completely made up of ceramic atoms 310. As a result, internal portion 306 has a CTE similar to the ceramic material forming internal portion 306 and ceramic substrate 320 (see, FIGS. 3A-3D), discussed herein. With comparison to FIGS. 3B and 3D, ceramic atoms 310 of internal portion 306 shrink and/or contract back to a substantially similar or identical position within ceramic component 300 as before ceramic substrate 320 was heated (see, FIG. 3B).

In the non-limiting example shown in FIG. 3F, external portion 302 includes both ceramic atoms 310 and dopant atoms 312 as a result of the heating and diffusion processes. As previously discussed herein with respect to FIG. 1C, the diffusion of atoms into external portion 302 of ceramic component 300 forms external portion 302 as a doped-ceramic material. As a result, external portion 302 has a different CTE than the ceramic material forming ceramic substrate 320 and/or internal portion 306 (see, FIGS. 3A-3D), discussed herein. The CTE for external portion 302 is different and lower than the CTE of internal portion 306. The lower CTE for external portion 302 is a result of the CTE for dopant material 322 and dopant atoms 312 diffused into external portion 302 being lower than the CTE of the ceramic material forming internal portion 306 and ceramic atoms 310. As a result, and with comparison to internal portion 306 of FIG. 3F, the combination of ceramic atoms 310 and dopant atoms 312 of external portion 302 shrink and/or contract less than the ceramic atoms 310 forming internal portion 306 of ceramic component 300.

Additionally as shown in FIG. 3F, the shrinkage and/or contraction of the atoms of external portion 302 also varies within external portion 302. As discussed herein, external portion 302 includes gradient 318 of atoms, where the concentration of dopant atoms 312 and/or ceramic atoms 310 varies. Specifically, the concentration of dopant atoms 312 is highest in portions of external portion 302 formed directly adjacent exterior surface 304 of ceramic component 300, and the concentration of dopant atoms 312 is lowest in portions of external portion 302 formed directly adjacent internal portion 306. Because the concentration and/or the presence of dopant atoms 312 within external portion 302 affects the CTE of external portion 302, the CTE may vary within external portion 302 based on the concentration of dopant atoms 312 formed therein. In a non-limiting example shown in FIG. 3F, portions of external portion 302 formed directly adjacent exterior surface 304 include high concentrations of dopant atoms 312 and therefore include a lower CTE than portions of external portion 302 formed directly adjacent internal portion 306, which include low concentrations of dopant atoms 312. As a result, and as shown in FIG. 3F, portions of external portion 302 formed directly adjacent exterior surface 304 shrink and/or contract less than portions of external portion 302 formed directly adjacent internal portion 306.

The cooling and the corresponding shrinkage and/or contraction of ceramic component 300 results in the formation of distinct stresses within ceramic component 300. Specifically, when ceramic component 300 is cooled and previously heated ceramic component 300 shrinks and/or contracts, distinct stresses are formed within and/or are experienced by the various portions (e.g., external portion 302, internal portion 306) of ceramic component 300. In non-limiting examples, a compressive stress is formed within external portion 302, and a tensile stress is formed within internal portion 306. In the non-limiting examples, external portion 302 is under a compressive stress because it shrinks and/or contracts, by comparison, less than internal portion 306. Additionally, internal portion 306 is under a tensile stress because it shrinks and/or contracts, by comparison, more than external portion 302. As discussed herein, the amount and/or distance of shrinkage and/or contraction for external portion 302 and internal portion 306 is dependent, at least in part, on the CTE for each portion forming ceramic component 300.

The processes performed on ceramic component 300, as shown and discussed herein with respect to FIGS. 3E and 3F, may correspond to operation 208 of the process 200 shown in FIG. 2.

Figure 3G:
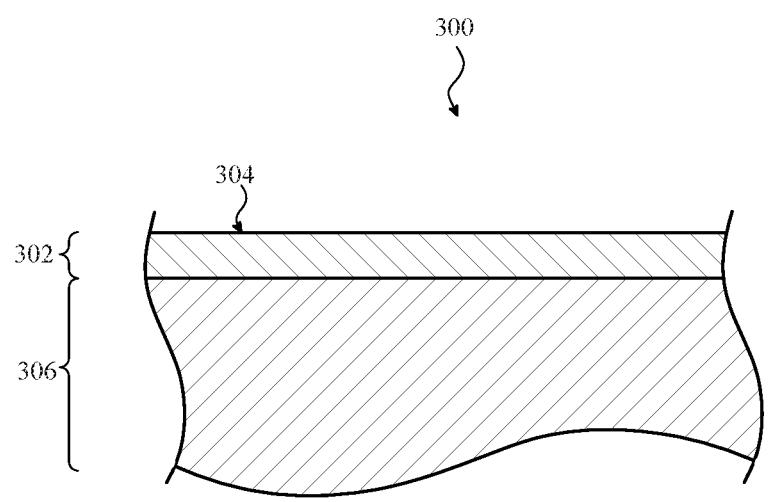
FIG. 3G shows a side cross-section view a ceramic component formed from the ceramic substrate of FIG. 3A. The ceramic component has an external portion and an internal portion.

FIG. 3G shows finalized ceramic component 300 that is configured to be implemented within an electronic device, as discussed herein. As shown in FIG. 3G, ceramic component 300 includes external portion 302, which is under a compressive stress, and internal portion 306, substantially surrounded by external portion 302, which is under a tensile stress. Additionally, dopant material 322 (see, FIG. 3E) is removed from exterior surface 304 of ceramic component 300 in FIG. 3G. Dopant material 322 previous applied to exterior surface 304 to form external portion 302 is removed using any suitable material removal technique and/or device. The material removal technique and/or device is dependent on, at least in part, the material composition of dopant material 322 and/or the application technique used to apply dopant material 322 to exterior surface 304 of ceramic component 300, as discussed herein. In a non-limiting example, dopant material 322 is removed from exterior surface 304 of ceramic component 300 using a polishing process.

Figure 4:
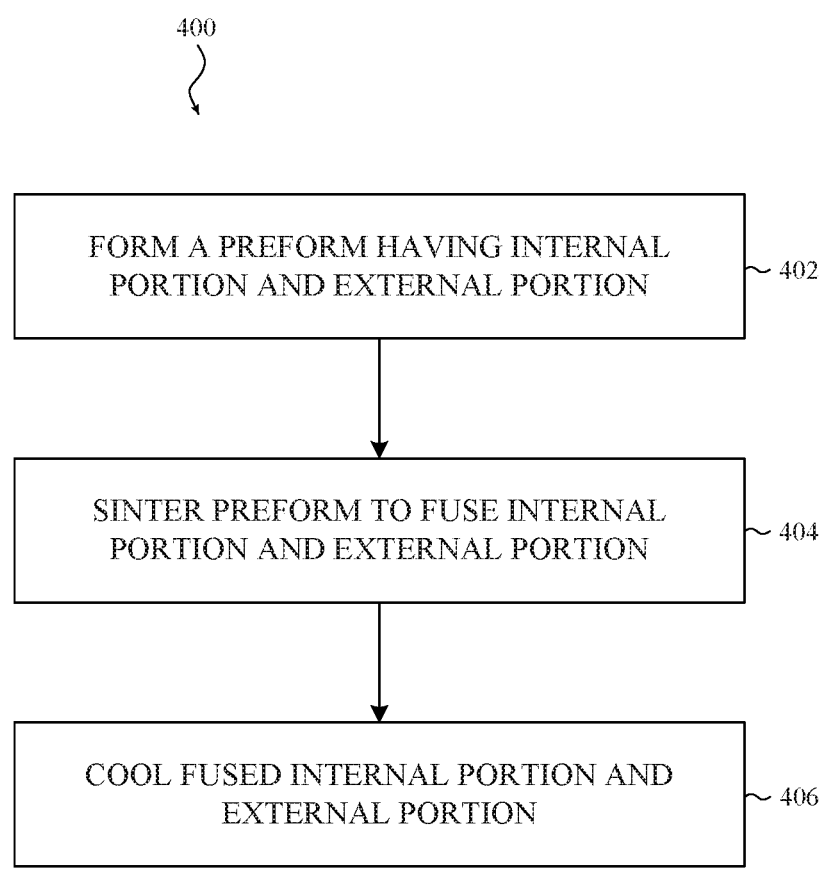
FIG. 4 shows a flow chart of an example process for forming a toughened ceramic component.

FIG. 4 depicts another example process for forming a toughened ceramic component. Specifically, FIG. 4 is a flowchart depicting one example process 400 for forming a toughened ceramic component having a residual compressive stress formed within an external portion to improve physical characteristics (e.g., toughness, brittleness, and so on) of the ceramic component. In some cases, the toughened ceramic component may be utilized in an electronic device, as discussed below with respect to FIG. 10.

In operation 402, a ceramic-based preform is formed. The ceramic-based preform is formed as a "green body" preform, which is an unsintered (or partially-sintered) ceramic item. As such, and as discussed herein, the ceramic-based material of the preform is made up of substantially raw material, for example, ceramic powder or bulk material. The ceramic-based preform includes an internal portion formed from a first ceramic-based material having a first coefficient of thermal expansion (CTE) and an external portion substantially surrounding the internal portion. The external portion is formed from a second ceramic-based material having a second CTE lower than the first CTE of the internal portion. The first ceramic-based material forming the internal portion of the preform is an undoped and/or substantially pure ceramic material. The second ceramic-based material forming the external portion of the preform is a doped, ceramic material and/or a ceramic material having additional material particles and/or atoms embedded therein.

Dependent on the material composition and/or the material state (e.g., printable material, powder, and so on) of the ceramic-based material, the forming of the preform can be performed in a variety of different manners and/or using a variety of techniques. In a non-limiting example, forming the preform can include a material printing process, where distinct layers of distinct ceramic-based materials are printed on each other. Specifically, an undoped, ceramic material is printed over a first layer of doped ceramic material, and a second layer of doped ceramic material is subsequently printed over and/or around the printed, undoped ceramic material. The second layer of printed, doped ceramic material substantially covers the printed, undoped ceramic material, such that the undoped ceramic material forms the internal portion of the preform, and the combination of the first and second layer of printed, doped ceramic material form the external portion of the preform.

In another non-limiting example, the ceramic-based material forming preform includes pre-manufactured sheets and/or rolls of material. In the non-limiting example, the forming of the preform includes performing a material tape-casting process. The tape-casting process used to form the preform includes layering at least one layer of an undoped ceramic material, formed in pre-manufactured sheets and/or rolls, over at least one layer of doped ceramic material, also formed in pre-manufactured sheets and/or rolls. Next, the tape-casting process includes layering at least one distinct layer of doped ceramic material over the undoped ceramic material. The distinct layer of doped ceramic material substantially covers the undoped ceramic material, such that the undoped ceramic material forms the internal portion of the preform, and the doped ceramic material forms the external portion of the preform.

In an additional non-limiting example, the ceramic-based material forming the preform includes bulk or powder-based material. In the non-limiting example, the forming of the preform includes layering the powder material and subsequently applying a compressive force to the layered powder material. Specifically, a layer of undoped ceramic material in powder form is positioned over a first layer of the doped ceramic material also in powder form. Next, a second layer of doped ceramic material in powder form is positioned over and/or substantially covers the layer of undoped ceramic material. Finally, a compressive force is applied to the first and second layers of doped ceramic material. The compressive force applied to the first and second layers of doped ceramic material combines and/or amalgamates at least a portion of the first and second layers of doped ceramic material with the undoped ceramic material prior to sintering the preform, as discussed herein.

In operation 404, the preform is sintered. The green body preform formed from raw ceramic-based materials is heated to a predetermined temperature and/or for a predetermined duration to sinter the preform. The predetermined temperature and/or predetermined heating time is dependent on, at least in part, the material composition of the ceramic-based material and the material state (e.g., bulk material, powder, printable material and so on) of the ceramic-based material forming the preform. The preform is heated using any suitable heating process and/or heating system, including, but not limited to, a laser, a flash-lamp, and a furnace or an oven.

The preform is sintered to fuse the particles and/or atoms of the ceramic-based material forming the preform. Specifically, when sintering the preform, the particles and/or atoms of the raw material forming the internal portion and the external portion are fused together. Additionally, the particles and/or atoms of the internal portion of the preform are fused to the particles and/or atoms of the external portion of the preform. As a result, the undoped ceramic material forming the internal portion of the preform is fused to the doped ceramic material forming the external portion, and vice versa.

The sintering and resulting fusion of the particles and/or atoms of the material forming the preform also results in the formation of a solid-state ceramic component. That is, when the atoms of the material forming internal and exterior portion are fused to one another and each other, the raw material preform formed from ceramic-based materials becomes a solid-state ceramic component. The solid-state ceramic component includes and/or maintains the internal portion and the external portion of the preform.

The sintering of the solid-state ceramic component also includes shrinking the ceramic component. Specifically, the sintering of the sintered preform formed from the raw ceramic-based material causes the external portion and the internal portion of the formed ceramic component to shrink. As a result of the different material composition and coefficients of thermal expansion (CTE), each portion of the ceramic component shrinks a different amount or distance and/or at a different rate during the sintering process. As discussed herein, the external portion of the ceramic component is formed from a second ceramic-based material having a lower CTE than the CTE of the first ceramic-based material forming the internal portion. As such, when the ceramic component is sintered, the external portion having the lower CTE shrinks less and/or slower than the internal portion having the higher CTE.

In operation 406, the fused internal portion and external portion are cooled, subsequent to sintering the preform to form the solid-state ceramic component in operation 404. Cooling the ceramic component can include gradually and/or naturally cooling the ceramic component by removing the ceramic component from the heating system and/or heating device. Alternatively, the ceramic component can be rapidly cooled by removing the ceramic component from the heating system and dunking or submerging the ceramic component into a cold-liquid bath.

In a non-limiting example, the distinct portions of the ceramic component continue to shrink in size, until the ceramic component reaches a predetermined temperature. Specifically, external portion and internal portion of the formed ceramic component continue to shrink as the temperature of the ceramic component decreases. When the ceramic component reaches the predetermined, cooled temperature, the external portion and the internal portion may not shrink and/or are in a steady-state of the material. Similar to the sintering process, the amount or distance and/or the rate in which the portions of the ceramic component shrink during the cooling process is dependent on the CTE of each portion. Additionally, the portions of the ceramic component may stop shrinking prior to reaching the predetermined, cooled temperature as a result of the difference in CTE for each portion. As one non-limiting example, external portion can stop shrinking prior to the ceramic component reaching the predetermined, cooled temperature as a result of the external portion having a lower CTE than the internal portion.

In another non-limiting example, once the cooling process of operation 406 begins, the shrinking of the ceramic component stops and/or is discontinued. As a result, once the ceramic component is starting to be cooled, the external portion and the internal portion of the ceramic component no longer shrink and/or contract. In the non-limiting example, the shrinking or contracting of the external portion and the internal portion of the ceramic component can be stopped or discontinued near-instantaneously by submerging the ceramic component in a cold-liquid bath to rapidly decrease the temperature of the ceramic component.

Cooling the fused internal portion and external portion results in a compressive stress is formed within the external portion of the ceramic component. The compressive stress is formed within the external portion as a result of the lower CTE for the external portion and because the external portion shrinks less than the internal portion of the ceramic component. Specifically, the shrinkage or contraction of the external portion of the ceramic component forms a compressive stress within the external portion of the ceramic component. The compressive stress formed in the external portion of the ceramic component improves the strength of the ceramic component when compared to untreated and/or unprocessed ceramic materials.

Although not shown, process 400 for forming a toughened ceramic component can include additional processes. In a non-limiting example, and as discussed herein, the process 400 can also include forming a tensile stress within the internal portion of the ceramic component. Similar to the formation of the compressive stress within the external portion, the tensile stress formed within the internal portion of the ceramic substrate is a result of the cooling of the ceramic component. Specifically, the tensile stress is formed within the internal portion as a result of the higher CTE for the internal portion and because the internal portion shrinks more than the external portion of the ceramic component. Additionally, the tensile stress is formed within the internal portion as a result of the external portion shrinking around the internal portion and/or a compressive stress being formed within the external portion, which substantially surrounds the internal portion.

In other non-limiting examples, the process 400 can include performing various material finishing processes on the ceramic component after forming the compressive stress in the external portion as discussed with respect to operation 406. In non-limiting examples, the ceramic component can undergo cutting, grinding, shaping, and/or polishing processes subsequent to forming the compressive stress in the external portion of the ceramic component.

FIGS. 5A-5E show side and enlarged cross-section views of a ceramic substrate 320 undergoing the example process 400 for forming a toughened ceramic component 500 (see, FIG. 5E) as discussed herein with respect to FIG. 4. It is understood that similarly numbered and/or named components may function in a substantially similar fashion. Redundant explanation of these components has been omitted for clarity.

Figure 5A:
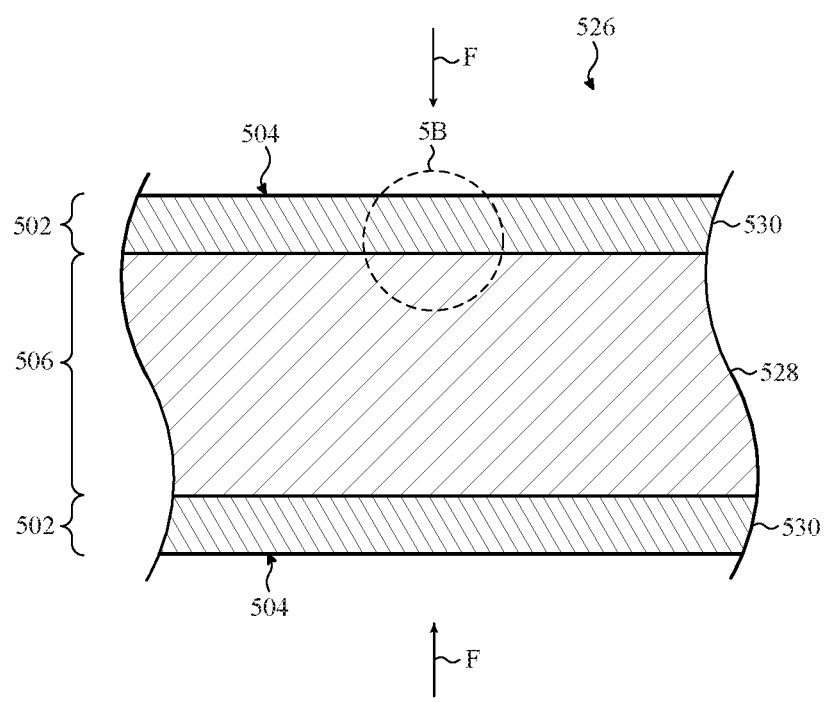
FIG. 5A shows a side cross-section view of a portion of a ceramic-based preform formed from undoped ceramic material and doped ceramic material.

FIG. 5A shows a side cross-section view of a portion of a ceramic-based preform 526 (hereafter, "preform 526"). Preform 526 is a "green body" preform, which is an unsintered ceramic item. The ceramic-based material of preform 526 is made up of substantially raw material, as discussed herein. As shown in FIG. 5A, preform 526 includes internal portion 506 and external portion 502 positioned adjacent internal portion 506. Preform 526 can include external portion 502 positioned on opposite sides of internal portion 506, as shown in FIG. 5A, or alternatively, can be formed to external portion 502 substantially surrounding internal portion 506, as discussed herein.

Both internal portion 506 and external portion 502 are formed from ceramic-based materials. As shown in FIG. 5A, the ceramic-based materials forming external portion 502 are distinct from the ceramic-based materials forming internal portion 506. A first ceramic-based material 528 is used to form internal portion 506. First ceramic-based material 528 is an undoped and/or substantially pure ceramic material, similar to the ceramic materials discussed herein, such as zirconia or alumina. A second ceramic-based material 530 is used to form external portion 502. Second ceramic-based material 530 is a doped ceramic material or a ceramic material including additional material, such as a dopant material, embedded therein. In a non-limiting example, second ceramic-based material 530 forming external portion 502 is formed from yttrium-doped zirconia, or zirconium (IV) oxide-yttria. In addition to being compositionally distinct (e.g., doped), second ceramic-based material 530 also has a distinct coefficient of thermal expansion (CTE) than first ceramic-based material 528. Specifically, the CTE for second ceramic-based material 530 is lower than the CTE for the first ceramic-based material 528. As discussed herein, the CTE of second ceramic-based material 530 is lower than the CTE of first ceramic-based material 528 because second ceramic-based material 530 includes both ceramic material and dopant material, as discussed herein.

Preform 526 can be formed using a variety of techniques. The techniques used to form preform 526 are dependent on, at least in part, the material composition and/or material state (e.g., printable material, bulk material, powder, and so on) of first ceramic-based material 528 and second ceramic-based material 530.

In a non-limiting example, preform 526 can be formed using a printing process. When forming preform 526 using the printing process, distinct layers of distinct ceramic-based materials, such as first and second ceramic-based material 528, 530, are printed on and/or over each other. In the non-limiting example, a layer of undoped, first ceramic-based material 528 is printed over a first layer of doped, second ceramic-based material 530. Additionally, a second layer of doped, second ceramic-based material 530 is printed over, around and/or substantially covers the printed layer of the undoped, first ceramic-based material 528. Although the portion of preform 526 shown in FIG. 5A only shows doped, second ceramic-based material 530 forming a top portion and bottom portion, it is understood that the second printed layer of doped, ceramic-based material 530 substantially covers all exposed sides of the layer of undoped, first ceramic-based material 528 and contacts the first layer of doped, second ceramic-based material 530. As such, and as similarly shown in FIG. 1B, the layer of printed undoped, first ceramic-based material 528 forms the internal portion 506 of preform 526, and the combination of the first and second printed layer of doped, second ceramic-based material 530 forms external portion 502 of preform 526.

In another non-limiting example, preform 526 can be formed using a tape-casting process. The tape-casting process includes layering and/or stacking pre-manufactured sheets and/or rolls of ceramic-based materials, such as first and second ceramic-based material 528, 530, on and/or over each other. In the non-limiting example, a layer of undoped, first ceramic-based material 528 is layered or cast over a first layer of doped, second ceramic-based material 530. Additionally, a second layer of doped, second ceramic-based material 530 is layered or cast over, around and/or substantially covers the cast layer of the undoped, first ceramic-based material 528. Similar to the non-limiting printing process discussed above, and as similarly shown in FIG. 1B, the layer of cast undoped, first ceramic-based material 528 forms the internal portion 506 of preform 526, and the combination of the first and second cast layer of doped, second ceramic-based material 530 forms external portion 502 of preform 526.

In a further non-limiting example, preform 526 can be formed by stacking layers of bulk or powdered ceramic-based material and subsequently applying a compressive force. The ceramic-based materials, such as first and second ceramic-based material 528, 530, are in bulk material and/or powder form. In the non-limiting example, forming preform 526 from bulk material and/or powder-form ceramic-based material includes positioning a layer of powder-form undoped, first ceramic-based material 528 over a first layer of powder-form doped, second ceramic-based material 530. Next, a second layer of powder-form doped, second ceramic-based material 530 is positioned over the layer of powder-form undoped, first ceramic-based material 528. Once the second layer of powder-form doped, second ceramic-based material 520 is positioned over first ceramic-based material 528, a compressive force (F) is applied to the first and second layer of doped, second ceramic-based material 530. As shown in FIG. 5A, the compressive force (F) is applied to both sides of preform 526 adjacent first and second layer of doped, second ceramic-based material 530 and is applied in a direction toward powder-form undoped, first ceramic based material 528. Applying the compressive force (F) combines the distinct powder-form ceramic-based materials to reduce the separation between each of the powders forming the distinct layers of preform 526. That is, the applied compressive force (F) combines and/or amalgamates at least a portion of the first and second layers of doped, second ceramic-based material 530 with the undoped, first ceramic-based material 528 prior to sintering preform 526, as discussed herein. The layer of powder-form undoped, first ceramic-based material 528 forms the internal portion 506 of preform 526, and the combination of the first and second layer of powder-form doped, second ceramic-based material 530 forms external portion 502 of preform 526.

Although single layers of ceramic-based materials 528, 530 are shown in FIG. 5A, it is understood that multiple layers of ceramic-based materials 528, 530 may be used to form the various layers and/or portions of preform 526. That is, internal portion 506 of preform 526 can be formed from a single layer or multiple layers of undoped, first ceramic-based material 528. Additionally, external portion 502 of preform 526 can be formed from a single layer or multiple layers of doped, second ceramic-based material 530.

Figure 5B:
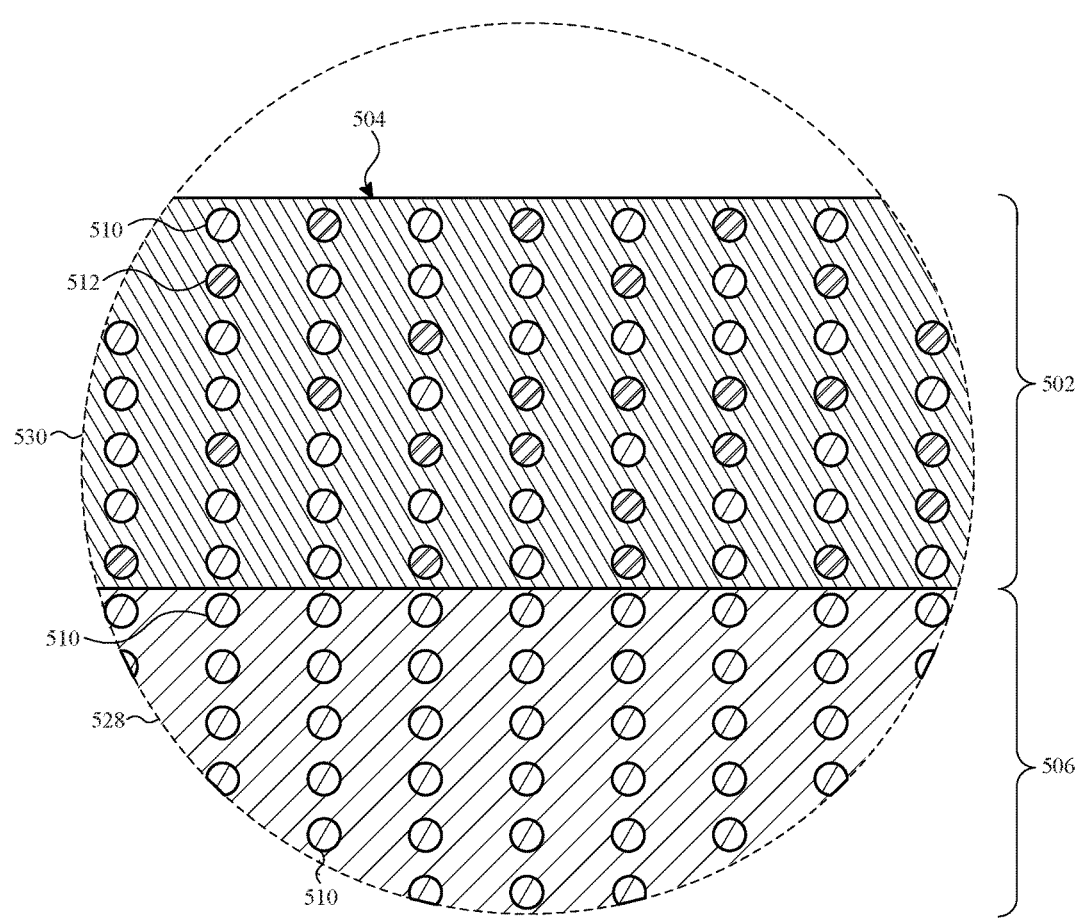
FIG. 5B shows an enlarged view of the portion of the ceramic-based preform of FIG. 5A.

FIG. 5B shows an enlarged portion of preform 526, as depicted in FIG. 5A. As shown in FIG. 5B, and discussed herein, preform 526 is depicted to include atoms, which represent the particles of matter that make up the material of preform 526. Additionally as discussed herein, preform 526 is a green body, and therefore the ceramic-based material 528, 530 forming preform 526 and respective atoms of the ceramic-based material is unsintered. The atoms of ceramic-based material 528, 530 are shown in FIG. 5B as unsintered using a distinct hash-mark pattern when compared to FIG. 1C, which depicts sintered ceramic atoms.

In the non-limiting example, internal portion 506 is formed from undoped, first ceramic-based material 528. As shown in FIG. 5B, and discussed herein, because first ceramic-based material 528 is undoped, internal portion 506 formed from first ceramic-based material 528 is free of dopant atoms 512 of a dopant material. Rather, undoped, first ceramic-based material 528 forming internal portion 506 includes only ceramic atoms 510. As such, undoped, first ceramic-based material 528 forming internal portion 506 is a pure ceramic material, similar to those ceramic materials discussed herein (e.g., zirconia, alumina, and so on).

Also shown in FIG. 5B, external portion 502 is formed from doped, second ceramic-based material 530. In the non-limiting example, and discussed herein, second ceramic-based material 530 is doped, and as such, external portion 502 formed from second ceramic-based material 530 includes both dopant atoms 512 of a dopant material and ceramic atoms 510. The dopant material and/or dopant atoms 512 included within doped, second ceramic-based material 530 forming external portion 502 includes any of the suitable dopant materials discussed herein (e.g., yttrium, silicon, and so on). As such, doped, second ceramic-based material 530 forming external portion 502 is a doped-ceramic material, similar to that ceramic material discussed herein (e.g., zirconium(IV) oxide-yttria).

The processes performed to form preform 526, as shown and discussed herein with respect to FIGS. 5A and 5B, may correspond to operation 402 of the process 400 shown in FIG. 4.

Figure 5C:
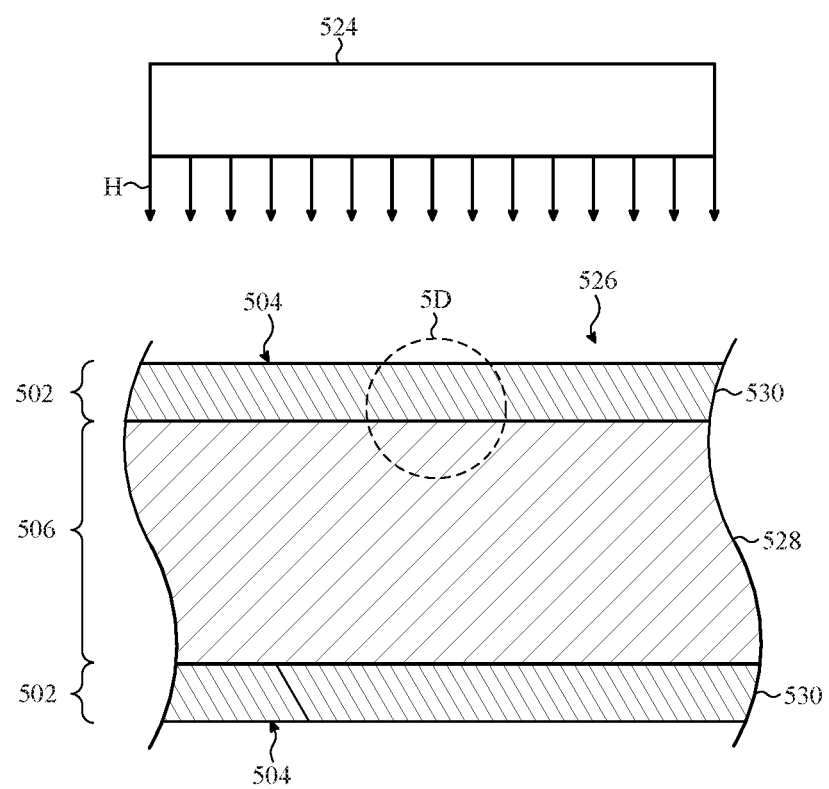
FIG. 5C shows a side cross-section view of the portion of the ceramic-based preform of FIG. 5A undergoing a sintering process.

FIG. 5C shows a heating device 524 positioned adjacent preform 526. Specifically, heating device 524 and preform 526 including internal portion 506 formed from undoped, first ceramic-based material 528 and external portion 502 formed from doped, second ceramic based material 530 are positioned adjacent and/or proximate one another, such that heating device 524 can provide heat (H) to preform 526. The heat (H) provided to preform 526 by heating device 524 sinters preform 526. In a non-limiting example, heating device 524 heats preform 526 to a predetermined temperature to sinter preform 526 and transform green body preform 526 into a fully sintered ceramic component 500 (see, FIGS. 5E and 5F). Heating device 524 is configured as any suitable heating component or system that is configured to heat preform 526 to the predetermined sintering temperature for preform 526.

Figure 5D:
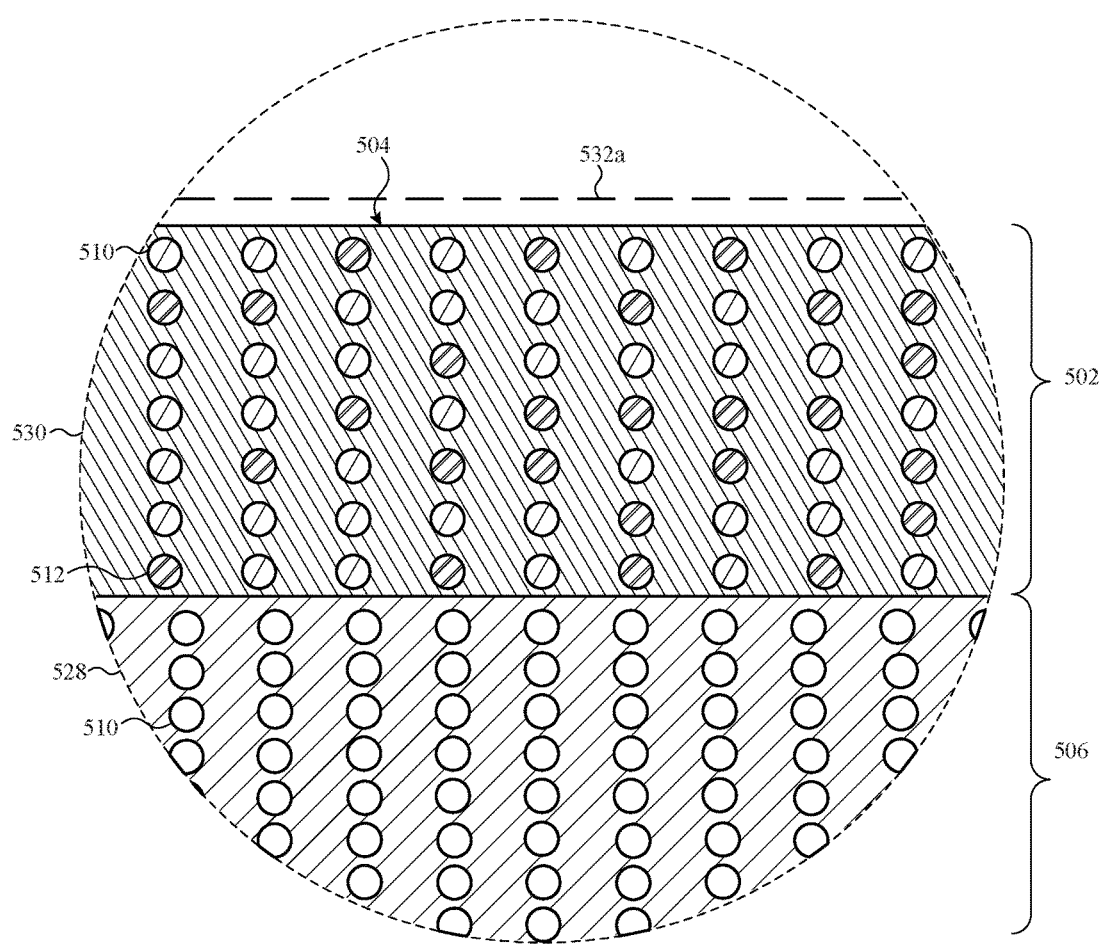
FIG. 5D shows an enlarged view of the portion of the ceramic-based preform of FIG. 5C.

Turning to FIG. 5D, the effects of heating and/or sintering preform 526 are more clearly shown. The non-limiting example shown in FIG. 5D, shows or depicts preform 526 partially sintered by heating device 524, as discussed herein. In response to heating or sintering preform 526, the ceramic-based material forming preform 526 begins to shrink or contract. Specifically, undoped, first ceramic-based material 528 forming internal portion 506 and doped, second ceramic based material 530 forming external portion 502 begin to shrink and/or contract when exposed to the heat from heating device 524 to sinter preform 526. As shown in FIG. 5D, and with comparison to FIG. 5B, external portion 502 formed from doped, second ceramic based material 530 shrinks or contracts when preform 526 is sintered. In the non-limiting example, exterior surface 504 of external portion 502 is positioned below the pre-sintered position 532a of exterior surface 504 (see, FIG. 5B) prior to preform 526 being sintered.

Although both internal portion 506 and external portion 502 of preform 526 shrink or contract during sintering, each portion of preform 526 shrinks and/or contracts different amounts or distances and/or at different rates. As shown in FIG. 5D, and with comparison to FIG. 5B, undoped, first ceramic-based material 528 forming internal portion 506 shrinks a greater amount and/or at a greater rate than doped, second ceramic-based material 530 forming external portion 502. Internal portion 506 of preform 526 shrinks and/or contracts a greater amount or distance than external portion 502 because of the difference in the CTE for the materials forming each portion. In the non-limiting example, internal portion 506 is formed from undoped, first ceramic-based material 528, which has a higher CTE than the CTE for doped, second ceramic-based material 530 forming external portion 502. As a result, when preform 526 is sintered, internal portion 506 shrinks and/or contracts a greater amount or distance and/or at a greater rate than external portion 502 having a CTE lower than the CTE for internal portion 506.

Additionally, because undoped, first ceramic-based material 528 forming internal portion 506 has a higher CTE than the CTE for doped, second ceramic-based material 530 forming external portion 502, internal portion 506 of preform 526 sinters before external portion 502. That is, undoped, first ceramic-based material 528 made up of ceramic atoms 510 sinter at lower temperatures and/or at a faster rate than doped, second ceramic-based material 530 formed from ceramic atoms 510 and dopant atoms 512, respectively. As shown in FIG. 5D, and with comparison to FIG. 5B, ceramic atoms 510 forming undoped, first ceramic-based material 528 are shown as sintered and do not include hash-markings previously corresponding to unsintered ceramic atoms 510 (see, FIG. 5B). Ceramic atoms 510 forming undoped, first ceramic-based material 528 of internal portion 506 are depicted in FIG. 5D as ceramic atoms 510 that are sintered, similar to those discussed herein with respect to FIG. 1C.

As shown in FIG. 5D, and with comparison to ceramic atoms 510 of undoped, first ceramic-based material 528 forming internal portion 506, ceramic atoms 510 of doped, second ceramic-based material 530 forming external portion 502 remain unsintered (see, FIG. 5B). Ceramic atoms 510 of doped, second ceramic-based material 530 forming external portion 502 are unsintered as a result of the lower CTE for doped, second ceramic-based material 530, and/or because of operational parameters and/or specifics of the sintering process performed on preform 526. In non-limiting examples where preform 526 is partially sintered, ceramic atoms 510 of doped, second ceramic-based material 530 forming external portion 502 remain unsintered as a result of the temperature of preform 526 not yet reaching the predetermined temperature to sinter doped, second ceramic-based material 530 and/or preform 526 not being exposed to heating device 524 for a long enough duration to sinter doped, second ceramic-based material 530.

The processes performed on preform 526 as shown and discussed herein with respect to FIGS. 5C and 5D, may correspond to operation 404 of the process 400 shown in FIG. 4.

Figure 5E:
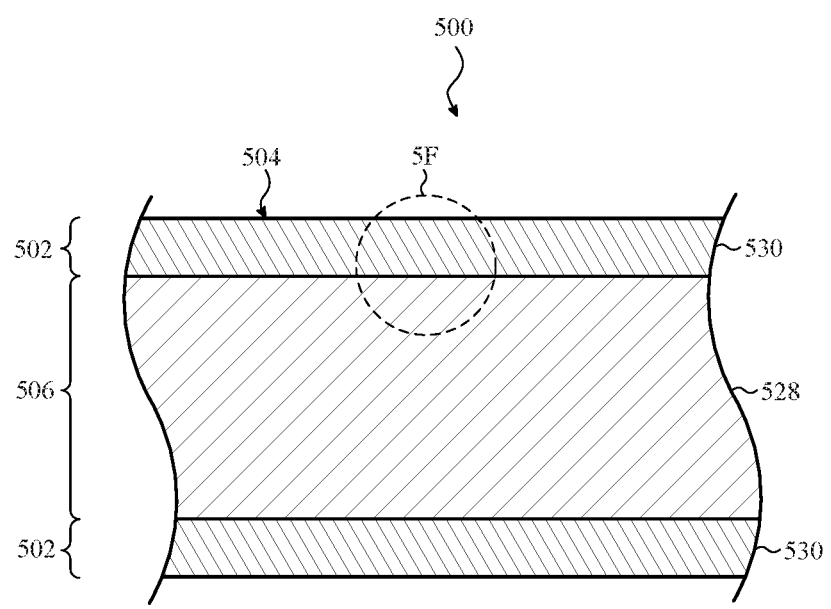
FIG. 5E shows a side cross-section view of the portion of the ceramic-based preform of FIG. 5A undergoing a cooling process.

FIG. 5E shows preform 526 (see, FIG. 5C) subsequent to being completely sintered and/or cooled. Specifically, preform 526 is heated to the predetermined sintering temperature, such that internal portion 506 and external portion 502 are sintered. Subsequent to sintering preform 526, ceramic-based preform 526 is cooled. The cooling of preform 526 results in the formation of ceramic component 500. In a non-limiting example shown in FIG. 5E, when preform 526 is cooled, ceramic component 500 is formed including internal portion 506 and external portion 502 substantially surrounding internal portion 506. As such, FIGS. 5E and 5F refer to previously discussed preform 526 as ceramic component 500.

Ceramic component 500 is cooled down to a predetermined temperature, for example room temperature. In non-limiting examples discussed herein, ceramic component 500 including internal portion 506 and external portion 502 is cooled naturally or organically by removing heat supplied by heating device 524 (see, FIG. 5C), or alternatively, is rapidly cooled by submerging the ceramic component 500 in a bath of cold liquid.

Figure 5F:
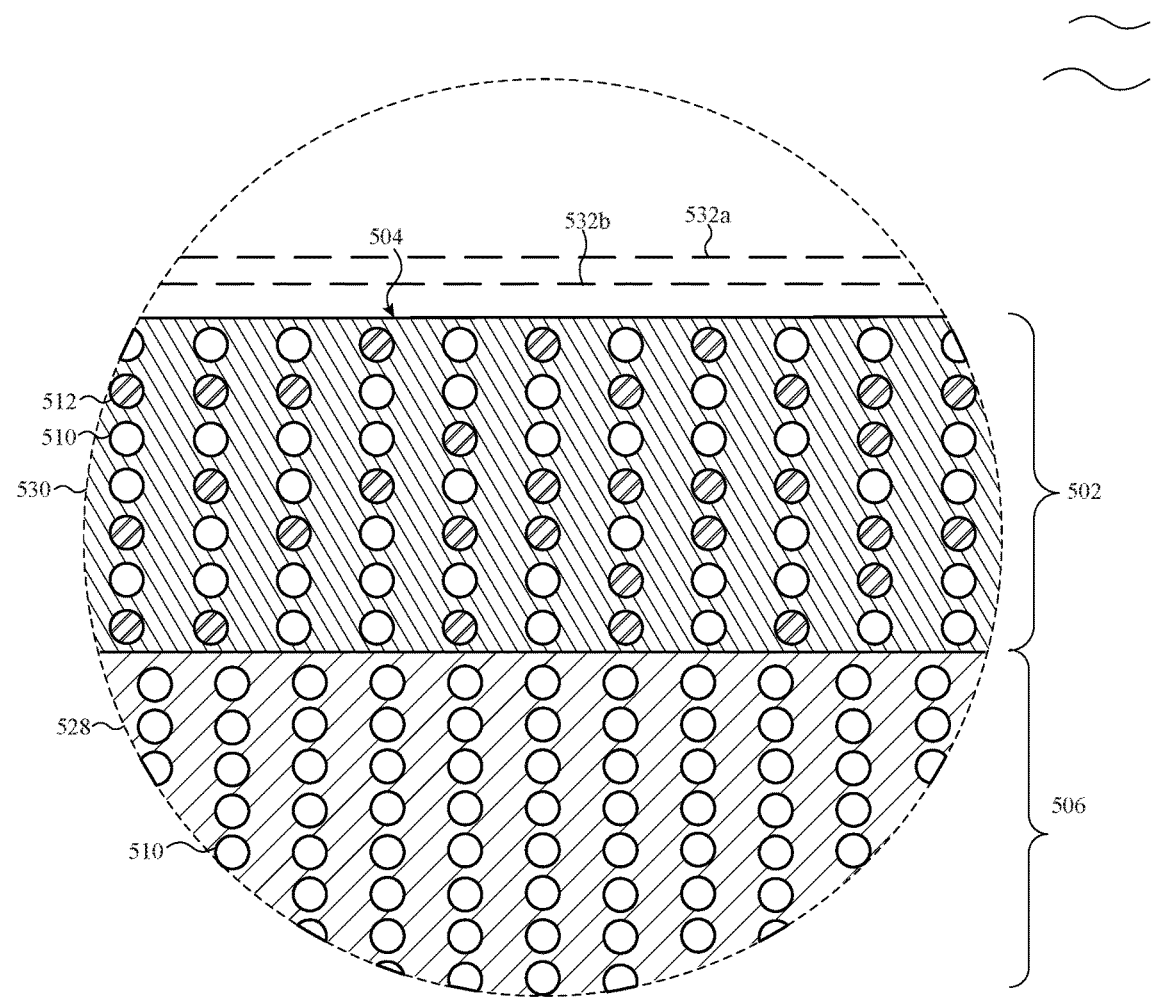
FIG. 5F shows an enlarged view of the portion of the ceramic-based preform of FIG. 5E.

Turning to FIG. 5F, the effects of completely sintering preform 526 (see, FIGS. 5C and 5D) and subsequently cooling formed ceramic component 500 are more clearly shown. As shown in FIG. 5F, and with comparison to FIG. 5D, all material forming ceramic component 500 is sintered. Specifically, ceramic atoms 510 of doped, second ceramic-based material 530 forming external portion 502 are shown or depicted as being sintered and no longer have similar hash-markings to unsintered ceramic atoms 510 (see, FIGS. 5B and 5D). As a result, preform 526 is fully and completely sintered and forms ceramic component 500 having sintered internal portion 506 and sintered external portion 502.

Although shown herein to have a single hash-mark pattern, it is understood that dopant atoms 512 are sintered similar to ceramic atoms 510. That is, although the hash-mark pattern for dopant atoms 512 does not change like ceramic atoms 510, it is understood that dopant atoms 512 may also be transformed from unsintered to sintered atoms like ceramic atoms 510, as discussed herein. In a non-limiting example, dopant atoms 512 are sintered simultaneous to ceramic atoms 510 in doped, ceramic-based materials such as doped, second ceramic-based material 530 forming external portion 502. As such, when ceramic atoms 510 are described as being sintered, it is understood that dopant atoms 512 are also sintered, and therefore doped, second ceramic-based material 530, including both dopant atoms 512 and ceramic atoms 510, is completely sintered.

The sintering and subsequent cooling of ceramic component 500 results in further shrinkage and/or contraction of ceramic component 500. As shown in FIG. 5F, ceramic component 500 shrinks and/or contracts a greater amount when completely sintered and/or cooled. With comparison to FIGS. 5B and 5D, the various atoms 510, 512 forming undoped, first ceramic-based material 528 and doped, second ceramic-based material 530 continue to shrink and/or contract from the unsintered state (see, FIG. 5B) of preform 526 and the partially sintered state (see, FIG. 5D) of preform 526. In the non-limiting example shown in FIG. 5F, exterior surface 504 of external portion 502 is positioned below the pre-sintered position 532a of exterior surface 504 (see, FIG. 5B) prior to preform 526 undergoing a sintering process. Exterior surface 504 of external portion 502 is also positioned below the partially-sintered position 532b of exterior surface 504 (see, FIG. 5D) prior to preform 526 being completely sintered.

In a non-limiting example, and as similarly discussed herein with respect to the sintering process shown in FIG. 5D, ceramic component 500 contracts and/or shrinks a different amount or distance, and/or at a different rate during the cooling process. Specifically, the distinct portions of ceramic component 500, external portion 502 and internal portion 506, shrink different amounts or distances and/or at different rates when ceramic component 500 undergoes the cooling process and is cooled to a predetermined, cooled temperature. When ceramic component 500 reaches the predetermined, cooled temperature, external portion 502 and internal portion 506 do not shrink and/or are in a steady-state. Similar to the sintering process, the amount or distance, and/or the rate in which the portions of ceramic component 500 shrink during the cooling process is dependent on the CTE of each portion. In the non-limiting example, internal portion 506 formed from undoped, first ceramic-based material 528 has a higher CTE than the CTE for external portion 502 formed from doped, second ceramic-based material 530. As a result, and as shown in FIG. 5F, undoped, ceramic-based material 528 forming internal portion 506 shrinks a greater amount and/or at a faster rate than doped, second ceramic-based material 530 forming external portion 502 during the cooling process.

Additionally, and similarly dependent on the difference in the CTE between internal portion 506 and external portion 502 of ceramic component 500, the portions of ceramic component 500 may stop shrinking or contracting prior to reaching the predetermined, cooled temperature during the cooling process. In a non-limiting example, external portion 502 formed from doped, second ceramic-based material 530 stops shrinking prior to ceramic component 500 reaching the predetermined, cooled temperature. External portion 502 may also stop shrinking and/or contracting while internal portion 506 formed from undoped, first ceramic-based material 528 continues to shrink or contract during the cooling process. The distinction between when external portion 502 and internal portion 506 of ceramic component 500 stop shrinking and/or contracting during the cooling process is a result of external portion 502 having a lower CTE than internal portion 506.

In another non-limiting example, once the cooling process of ceramic component 500 begins, the shrinking of the ceramic component 500 stops and/or is discontinued. As a result, once ceramic component 500 is starting to be cooled, external portion 502 and internal portion 506 of ceramic component 500 no longer shrink and/or contract. In the non-limiting example, the shrinking or contracting of external portion 502 and internal portion 506 can be stopped or discontinued near-instantaneously by submerging ceramic component 500 in a cold-liquid bath to rapidly decrease the temperature of ceramic component 500 to the predetermined, cooled temperature discussed herein.

The sintering, cooling and the corresponding shrinkage and/or contraction of ceramic component 500 also results in the formation of distinct stresses within ceramic component 500. Specifically, when sintered ceramic component 500 is cooled and ceramic component 500 shrinks and/or contracts, distinct stresses are formed within and/or experienced by the various portions (e.g., external portion 502, internal portion 506) of ceramic component 500. In non-limiting examples, and as discussed herein, a compressive stress is formed within external portion 502, and a tensile stress is formed within internal portion 506.

The processes performed on preform 526, as shown and discussed herein with respect to FIGS. 5E and 5F, may correspond to operations 404 and 406 of the process 400 shown in FIG. 4.

Figure 6:
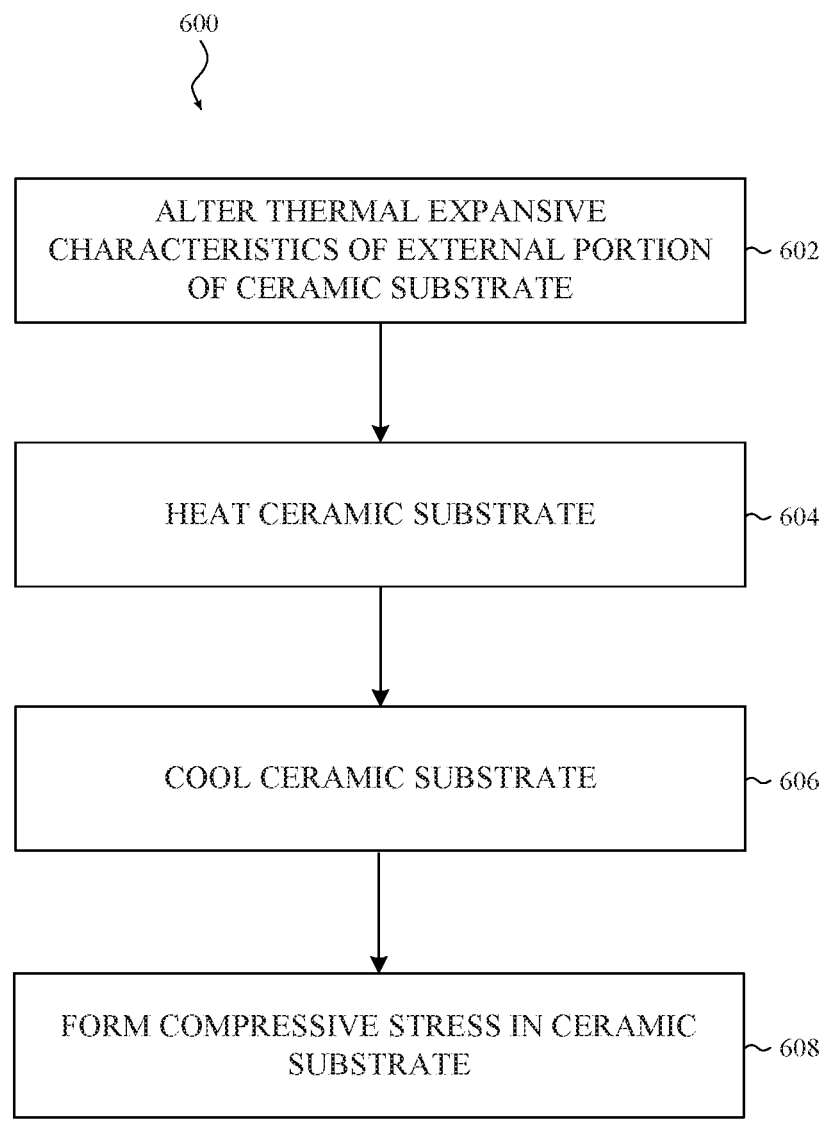
FIG. 6 shows a flow chart of an example process for forming a toughened ceramic component.

FIG. 6 depicts an additional example process for forming a toughened ceramic component. Specifically, FIG. 6 is a flowchart depicting one example process 600 for forming a toughened ceramic component having a residual compressive stress formed within an external portion to improve physical characteristics (e.g., toughness, brittleness, and so on) of the ceramic component. In some cases, the toughened ceramic component may be utilized in an electronic device, as discussed below with respect to FIG. 10.

In operation 602, thermal expansion characteristics of an external portion of a ceramic preform are altered. The thermal expansion characteristics of the external portion of the ceramic preform are altered such that they are different or distinct from the thermal expansion characteristics for an internal portion of the ceramic preform substantially surrounded by the external portion. The thermal expansion characteristics of an external portion of a ceramic preform include a coefficient of thermal expansion (CTE), a sintering temperature, and/or a sintering rate.

In a non-limiting example, altering the thermal expansion characteristics of the external portion of the ceramic preform includes forming the external portion and the internal portion from a bulk ceramic material, such that ceramic preform is a green body ceramic item, similarly discussed herein with respect to FIGS. 4-5F. In the non-limiting example where the ceramic preform is formed from a bulk ceramic material, the external portion is formed from a ceramic material having a first grain of a first size, and the internal portion is formed from the ceramic material having a second grain of a second size. The second grain of the ceramic material forming the internal portion of the ceramic preform is larger than the first grain of the ceramic material forming the internal portion. The ceramic material forming each of the internal portion and the external portion are materially and/or compositionally identical, except for the difference in the grain size of the material forming each portion of the ceramic component.

Although compositionally identical and/or formed from the same ceramic material, the grain size of the material used to form each portion of the ceramic preform alters the thermal expansion characteristics for the internal portion and/or the external portion of the ceramic preform. Additionally, because the grain size of the ceramic material forming the external portion of the ceramic preform is smaller than the grain size of the ceramic material forming the internal portion, the thermal expansion characteristics for the external portion are distinct and/or different than the thermal expansion characteristics for the internal portion. In a non-limiting example, the smaller grain size of the ceramic material forming the external portion alters, varies and/or increases the coefficient of thermal expansion (CTE) of the external portion when compared to the CTE of the internal portion. As a result, although formed from compositionally the same material, the external portion has a higher CTE than the CTE of the internal portion because of the smaller grain size of the ceramic material forming the external portion. As discussed herein, the external portion shrinks and/or contracts a greater amount than the internal portion during a sintering process as a result of the external portion having a higher CTE.

In another non-limiting example, the smaller grain size of the ceramic material forming the external portion of the ceramic preform alters, varies and/or decreases the sintering temperature for the external portion when compared to the sintering temperature of the internal portion. As similarly discussed herein, although formed from compositionally the same material, the external portion has a lower sintering temperature than the sintering temperature for the internal portion because of the smaller grain size of the ceramic material forming the external portion. As a result, and as discussed herein, the external portion shrinks and/or contracts sooner and/or a greater amount than the internal portion during a sintering process as a result of the external portion having a lower sintering temperature than the internal portion.

In a further non-limiting example, the smaller grain size of the ceramic material forming the external portion alters, varies and/or increases the sintering rate for the external portion. As a result of the external portion having the higher sintering rate than a sintering rate of the internal portion, the external portion shrinks and/or contracts sooner, more and/or at a greater rate than the internal portion during a sintering process, as discussed herein.

Although discussed herein as distinct non-limiting examples, it is understood that the thermal expansion characteristics (e.g., CTE, sintering temperature, and sintering rate) discussed herein are not mutually exclusive. That is, altering one non-limiting example of the thermal expansion characteristics of the external portion to be distinct from the thermal expansion characteristics of the internal portion can also result in the altering of another non-limiting example thermal expansion characteristic. For example, the altering and/or increasing of the CTE for the external portion of the ceramic preform may also lower the sintering temperature and/or increase the sintering rate for the external portion.

In operation 604, the ceramic preform is sintered. The green body ceramic preform including the internal portion and the external portion formed from a ceramic material is heated to sinter the ceramic preform. The sintering of ceramic preform includes heating the ceramic preform to a first sintering temperature and sintering the external portion of the ceramic preform formed from the ceramic material having the first grain smaller than the second grain of the ceramic material forming internal portion. The first sintering temperature corresponds to a predetermined sintering temperature for the altered thermal expansion characteristics of the external portion of the ceramic preform. As discussed herein, the altering of the thermal expansion characteristics of the external portion of the ceramic preform can include increasing the CTE for the external portion, decreasing the sintering temperature, and/or increasing the sintering rate for the external portion. In a non-limiting example, when the ceramic preform is heated to the first sintering temperature and the external portion of the ceramic preform is sintered, the internal portion of the ceramic preform can remain unaffected, unsintered and/or in a green body state.

The sintering of the ceramic preform can also include heating the ceramic preform to a second sintering temperature greater than the first sintering temperature and sintering the internal portion of the ceramic preform formed from the ceramic material having the second grain. The second sintering temperature is greater than the first sintering temperature. In addition to sintering the internal portion, heating the ceramic preform to the second sintering temperature greater than the first sintering temperature also results in the continued sintering of the external portion of the ceramic preform. As discussed herein, the preform is heated using any suitable heating process and/or heating system including, but not limited to, a laser, a flash-lamp, and a furnace or an oven.

The sintering of the ceramic preform also includes shrinking and/or contracting of the external portion and the internal portion of the ceramic preform. However, because of the altered and/or distinct thermal expansion characteristics between the external portion and the internal portion of the ceramic preform, the portions of the ceramic preform sinter at different temperatures and/or different rates and, therefore, shrink and/or contract at different amounts or distances and/or at different rates. As discussed herein, heating the ceramic preform to the first sintering temperature and sintering the external portion formed from the ceramic material having the first grain smaller than the second grain of the internal portion also results in the shrinkage and/or contraction of the external portion. While the external portion shrinks and/or contracts, the internal portion of the ceramic preform can remain unaffected, unsintered and/or does not contract. Only when the ceramic component is heated to the second sintering temperature does the internal portion of the ceramic preform sinter and, therefore, shrink or contract. Additionally, because of the distinction or differences in the grain sizes of the ceramic material forming the external portion and the internal portion and the altering of the thermal expansion characteristics of the external portion, the external portion shrinks and/or contracts a greater distance than the internal portion of the ceramic preform.

As similarly discussed herein with respect to operation 404 in process 400, the ceramic preform is sintered to fuse the particles and/or atoms of the ceramic material forming the ceramic material. Specifically, the particles and/or atoms of the internal portion of the ceramic preform are fused to each other and to the particles and/or atoms of the external portion of the ceramic preform. Additionally as discussed herein, the sintering and resulting fusion of the particles and/or atoms of the ceramic material forming the ceramic preform also results in the formation of a solid-state ceramic component. The solid-state ceramic component includes and/or maintains the internal portion and the external portion of the ceramic preform.

In operation 606, the sintered ceramic preform including the fused internal portion and external portion are cooled. That is, subsequent to sintering the ceramic preform to form the solid-state ceramic component in operation 604, the ceramic component, including fused internal and external portions, is cooled. The ceramic component, including the external portion and the internal portion, is cooled to lower the temperature of the ceramic component. As similarly discussed herein with respect to operation 406 of process 400 (see, FIG. 4), cooling the ceramic component can include gradually and/or naturally cooling the ceramic component, or alternatively, rapidly cooling the ceramic component.

Additionally, and as discussed herein with respect to operation 406, the distinct portions of the ceramic component continue to shrink in size, until the ceramic component reaches a predetermined, cooled temperature. Specifically, external portion and internal portion of the formed ceramic component continue to shrink as the temperature of the ceramic component decreases. Similar to the sintering process, the amount or distance, and/or the rate in which the portions of the ceramic component shrink during the cooling process is dependent on the thermal expansion characteristics of each portion. Additionally, the portions of the ceramic component may stop shrinking prior to reaching the predetermined, cooled temperature as a result of the difference in thermal expansion characteristics for each portion. In a non-limiting example, internal portion can stop shrinking prior to the ceramic component reaching the predetermined, cooled temperature as a result of the internal portion having larger grain sizes than the external portion, resulting in a lower CTE, a higher sintering temperature and/or a lower sintering rate than the external portion.

In another non-limiting example, once the cooling process of operation 606 begins, the shrinking of the ceramic component stops and/or is discontinued. As a result, once the ceramic component is starting to be cooled, the external portion and the internal portion of the ceramic component no longer shrink and/or contract.

In operation 608, a compressive stress is formed within the external portion of the ceramic component. The compressive stress is formed within the external portion as a result of the external portion shrinking and/or contracting more than the internal portion of the ceramic component as a result of the distinction or difference in the grain sizes of the ceramic material forming each portion and/or the thermal expansion characteristics of each portion of the ceramic component. The compressive stress formed in the external portion of the ceramic component improves the strength, toughness, brittleness and/or improves protection against damage to the ceramic component, as well as mitigates and/or prevents the spreading of surface defects within the ceramic preform, as discussed herein.

Although not shown, process 600 for forming a toughened ceramic component can include additional processes. In a non-limiting example, and as similarly discussed herein, the process 600 can also include forming a tensile stress within the internal portion of the ceramic component. The tensile stress is formed within the internal portion as a result of the external portion shrinking around the internal portion and/or a compressive stress being formed within the external portion, which substantially surrounds the internal portion.

FIGS. 7A-7F show side and enlarged cross-section views, respectively, of a ceramic preform 726 undergoing the example process 600 for forming a toughened ceramic component 700 (see, FIG. 7F) as discussed herein with respect to FIG. 6. It is understood that similarly numbered and/or named components may function in a substantially similar fashion. Redundant explanation of these components has been omitted for clarity.

Figure 7A:
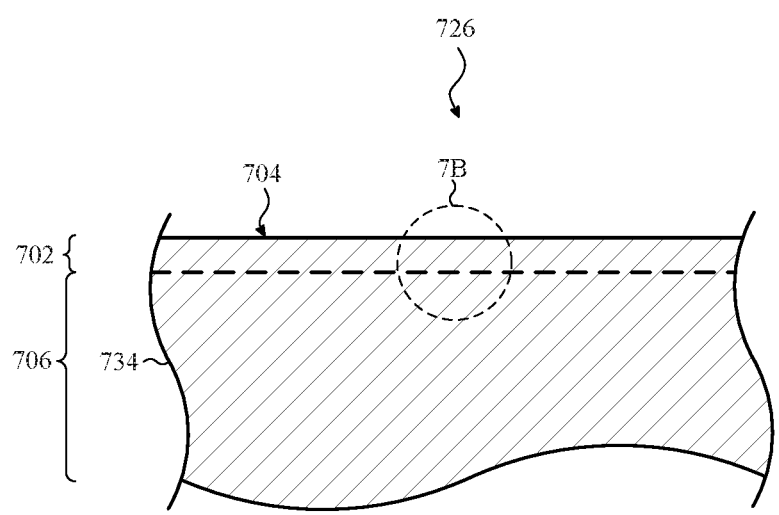
FIG. 7A shows a side cross-section view of a portion of a ceramic material formed with two distinct grain sizes of material.

FIG. 7A shows a side cross-section view of a portion of a ceramic material preform 726 (hereafter, "preform 726"). Preform 726 is a "green body" preform, made up of substantially raw material, as discussed herein.

As shown in FIG. 7A, preform 726 includes internal portion 706 and external portion 702 substantially surrounding internal portion 706. However, distinct from the ceramic substrates and preforms discussed previously (see, FIGS. 3A-3G and 5A-5F), both internal portion 706 and external portion 702 of preform 726 are formed from the same ceramic material 734. Ceramic material 734 is materially and/or compositionally similar or identical in both internal portion 706 and external portion 702. As shown in FIG. 7A, internal portion 706 and external portion 702 are separated by a phantom reference line for ease of differentiating the portions, and the distinction between internal portion 706 and external portion 702 of preform 726 is discussed in detail below with respect to FIG. 7B. Ceramic material 734 forming the entire preform 726 can be a substantially pure ceramic material, similar to the ceramic materials discussed herein, such as zirconia or alumina. Preform 726 can be formed using a variety of techniques similarly discussed herein with respect to the preform of FIG. 5A.

Figure 7B:
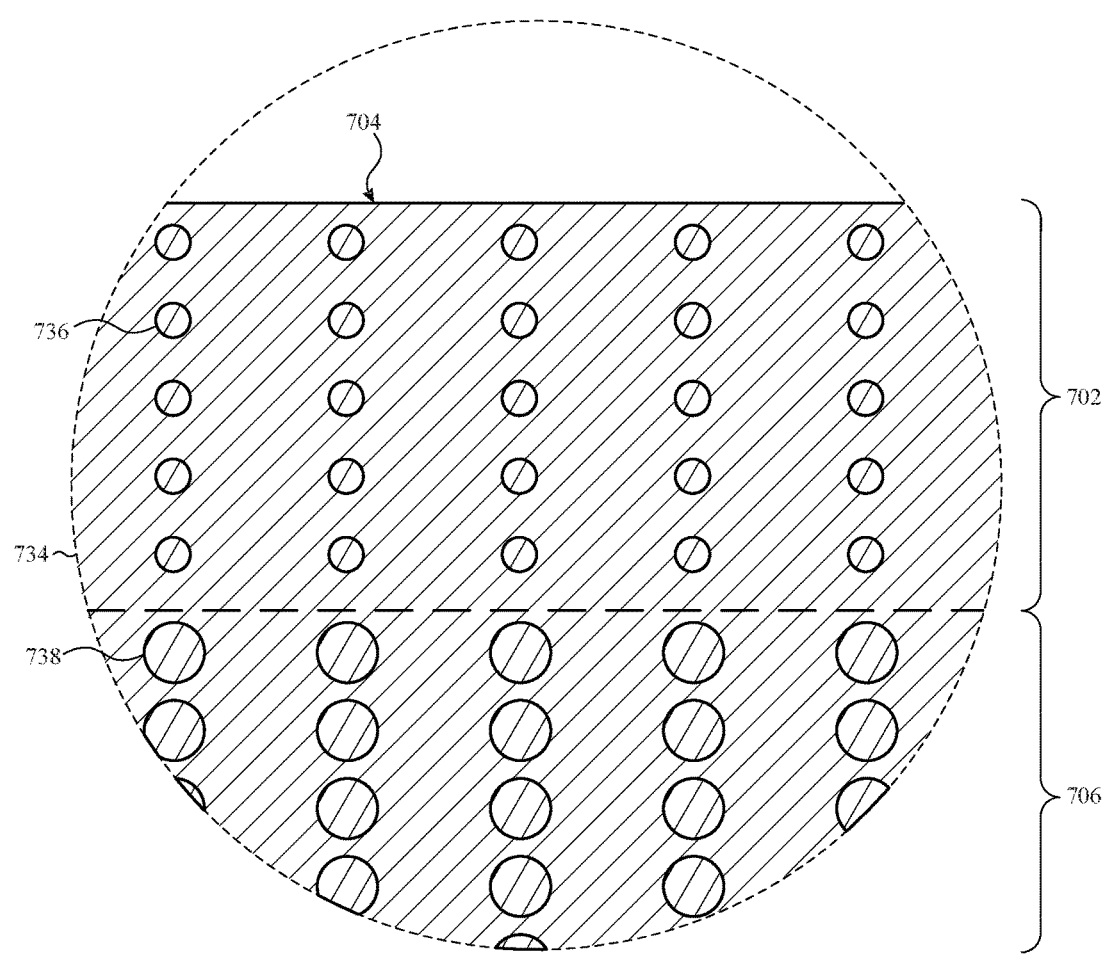
FIG. 7B shows an enlarged view of the portion of the ceramic material of FIG. 7A.

FIG. 7B shows an enlarged portion of preform 726, as depicted in FIG. 7A. As shown in FIG. 7B, green body preform 726 is depicted to include unsintered material grains or crystals of ceramic material 734 forming preform 726. Although depicted as being similar to the atoms and/or atoms discussed herein with respect to FIGS. 1C, 3A-3G and 5A-5F, ceramic material 734 shown in FIGS. 7B, 7D and 7E, depicts material grains or crystals of ceramic material 734 and how the grains are affected when forming the toughened ceramic component 700, as discussed herein.

Although materially and/or compositionally identical by being formed from ceramic material 734, external portion 702 is distinct from internal portion 706. That is, external portion 702 includes altered thermal expansion characteristics that are distinct and/or different from internal portion 706 of preform 726, even though both external portion 702 and internal portion 706 are formed from ceramic material 734. The altering of the thermal expansion characteristics of external portion 702 is a result of forming external portion 702 and internal portion 706 from material grains 736, 738 of ceramic material 734 having distinct sizes. As shown in FIG. 7B, external portion 702 is formed from ceramic material 734 having first material grain 736 of a first size, and internal portion 706 is formed from compositionally the same ceramic material 734 having second material grain 738 of a second size. Second grain 738 of ceramic material 734 forming internal portion 706 has a larger grain size than first grain 736 of ceramic material 734 forming external portion 702.

As discussed herein, by forming external portion 702 from ceramic material 734 having first grain 736 smaller than second grain 738 of internal portion 706, thermal expansion characteristics of external portion 702 are altered and/or distinct from thermal expansion characteristics of internal portion 706. In a non-limiting example, external portion 702 formed from smaller, first grain 736 has a higher coefficient of thermal expansion (CTE) than the CTE for internal portion formed from larger, second grain 738. In other non-limiting examples, external portion 702 has a lower sintering temperature and/or a higher sintering rate than the sintering temperature and/or rate of internal portion 706 of preform 726. As discussed herein, the distinction and/or difference of the thermal expansion characteristics between external portion 702 and internal portion 706 of preform 726 affects the formation of toughened ceramic component 700 (see, FIG. 7F), discussed herein.

The processes performed to form preform 726 as shown and discussed herein with respect to FIGS. 7A and 7B, may correspond to operation 602 of the process 600 shown in FIG. 6.

Figure 7C:
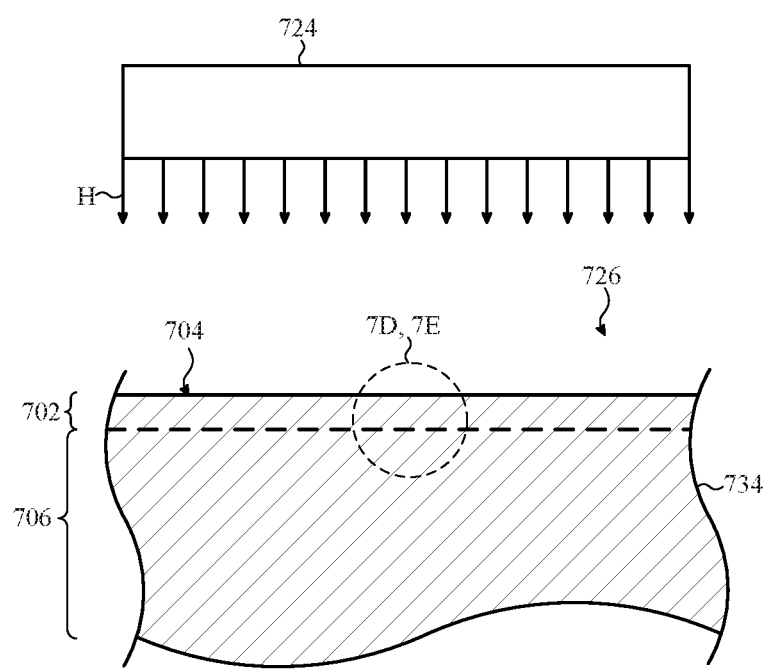
FIG. 7C shows a side cross-section view of the portion of the ceramic material of FIG. 7A undergoing a first and second sintering process.
Figure 7D:
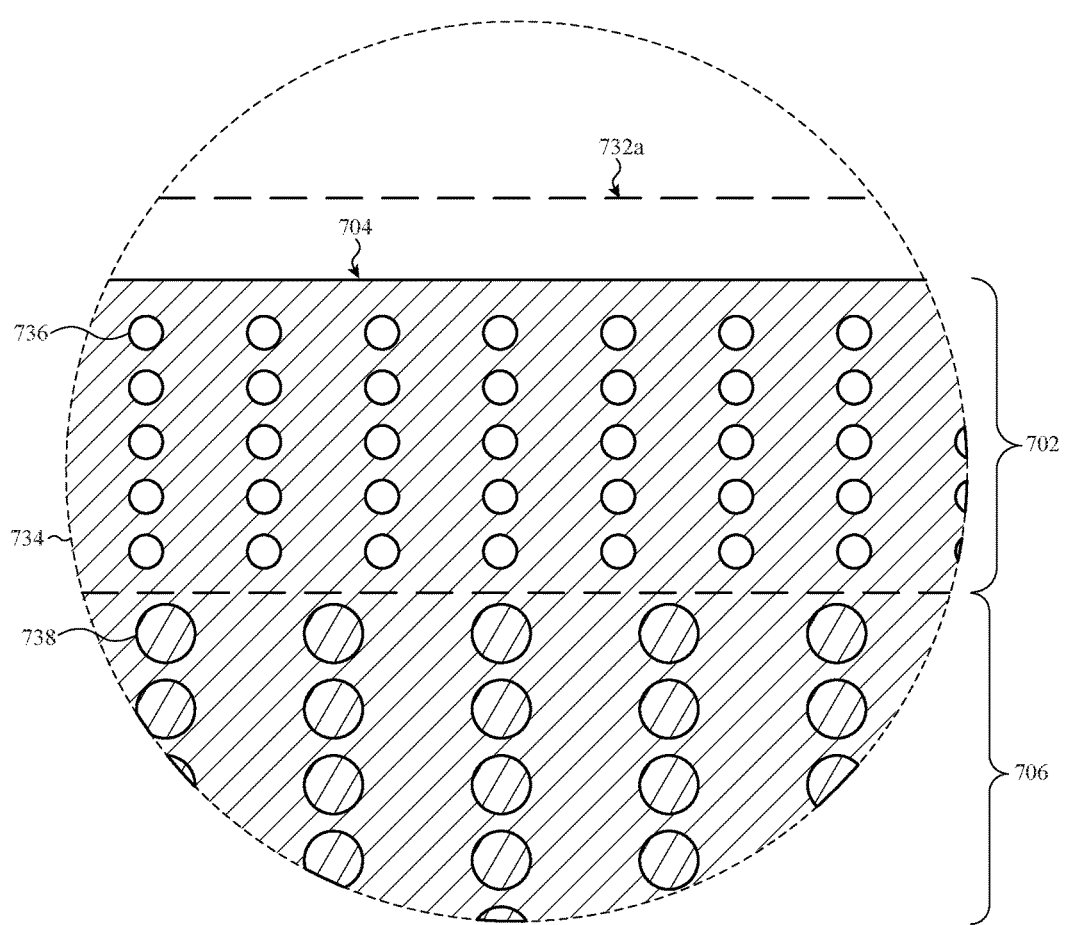
FIG. 7D shows an enlarged view of the portion of the ceramic material of FIG. 7C undergoing the first sintering process.
Figure 7E:
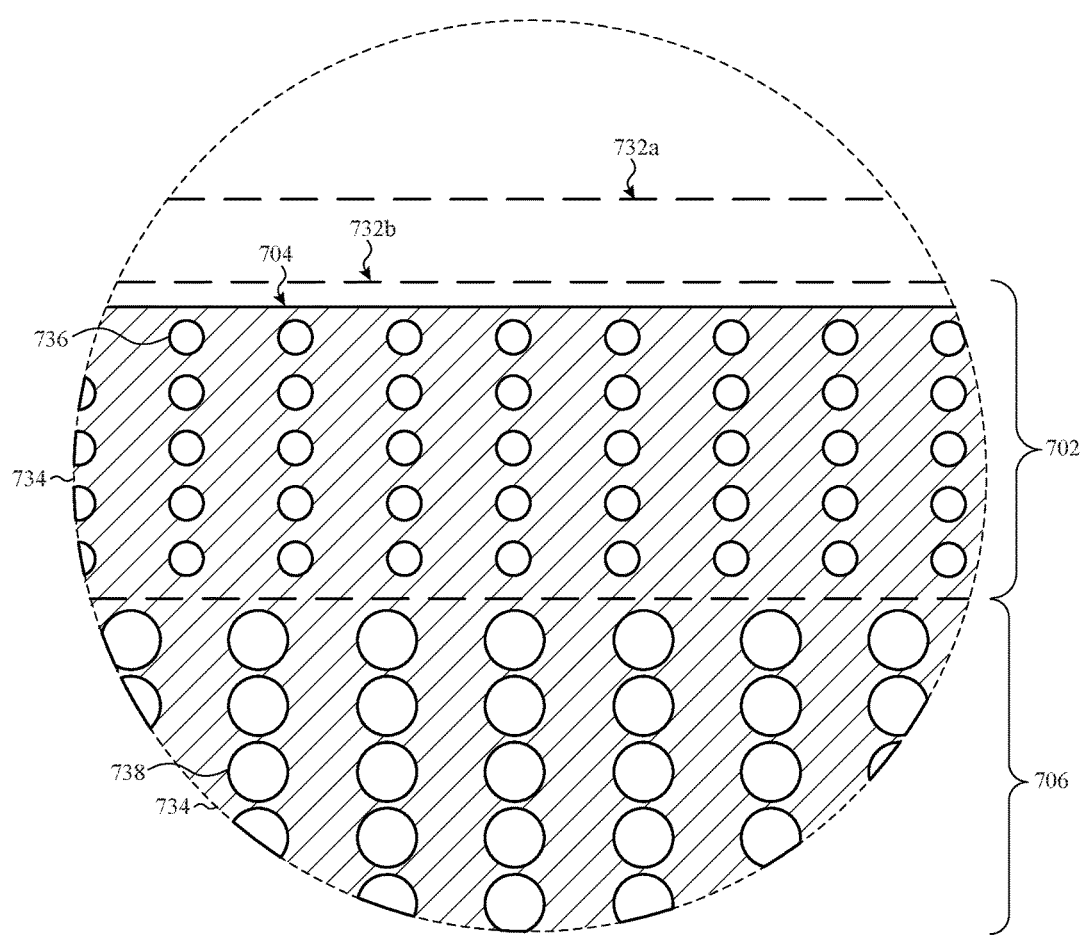
FIG. 7E shows an enlarged view of the portion of the ceramic material of FIG. 7C undergoing the second sintering process.

FIG. 7C shows a heating device 724 positioned adjacent preform 726. Specifically, preform 726, including internal portion 706 formed from ceramic material 734 having first grain 736 (see, FIGS. 7D and 7E) and external portion 702 formed from ceramic material 734 having second grain 736, is positioned adjacent and/or proximate heating device 724, such that heating device 724 can provide heat (H) to preform 726. The heat (H) provided to preform 726 by heating device 724 sinters preform 726, as similarly discussed herein with respect to FIG. 5C. As discussed in detail herein, heating device 724 can heat preform 726 to a first sintering temperature for sintering external portion 702 of preform 726 (see, FIG. 7D) and can heat preform 726 to a second sintering temperature for sintering internal portion 706 (see, FIG. 7E).

Turning to FIGS. 7D and 7E, the effects of heating and/or sintering preform 726 are more clearly shown. The non-limiting example shown in FIG. 7D shows or depicts preform 726 heated to a first sintering temperature and/or partially sintered. In response to heating preform 726 to the first sintering temperature, external portion 702 of preform 726 is sintered. As shown in FIG. 7D, and with comparison to FIG. 7B, first grain 736 of ceramic material 734 forming external portion 702 is sintered (e.g., no hash-markings) when preform 726 is heated to the first sintering temperature. Additionally shown in FIG. 7D, second grain 738 of ceramic material 734 forming internal portion 706 remains unsintered.

Heating preform 726 to the first sintering temperature, as shown in FIG. 7D, also results in external portion 702 beginning to shrink or contract. Specifically, ceramic material 734 forming external portion 702 begins to shrink and/or contract when heating device 724 heats preform 726 to the first sintering temperature to sinter external portion 702. As shown in FIG. 7D, and with comparison to FIG. 7B, external portion 702 shrinks or contracts when preform 726 is heated to the first sintering temperature. In the non-limiting example, exterior surface 704 of external portion 702 is positioned below the pre-sintered position 732a of exterior surface 704 (see, FIG. 7B) prior to preform 726 being heated, as shown in FIG. 7D. Distinct from external portion 702, and as shown in FIG. 7D, ceramic material 734 forming internal portion 706 remains in a steady-state and/or does not shrink or contract when preform is heated to the first sintering temperature.

The sintering and/or shrinkage of external portion 702 of preform 726 is dependent on the altered thermal expansion characteristics of external portion 702. As discussed herein, external portion 702 includes different or distinct thermal expansion characteristics when compared to internal portion 706 as a result of the portions of preform 726 being formed from the same ceramic material 734, but with distinct material grain sizes for each portion. Specifically, thermal expansion characteristics are distinct between internal portion 706 and external portion 702 as a result of external portion 702 being formed from ceramic material 734 having first grain 736 that is smaller than second grain 738 of ceramic material 734 forming internal portion 706. In non-limiting examples discussed herein, forming external portion 702 from ceramic material 734 having first grain 736 increases the CTE, lowers the sintering temperature and/or increases the sintering rate. As such, and as described above with respect to FIG. 7D, external portion 702 sinters and/or shrinks or contracts at a first sintering temperature, while internal portion 706 remains in a steady-state and does not sinter and/or shrink or contract.

The non-limiting example shown in FIG. 7E, shows or depicts preform 726 heated to a second sintering temperature and/or completely sintered. The second sintering temperature is higher or greater than the first sintering temperature discussed herein with respect to FIG. 7D. In response to heating preform 726 to the second sintering temperature, internal portion 706 of preform 726 is now sintered. As shown in FIG. 7E, and with comparison to FIGS. 7B and 7D, second grain 738 of ceramic material 734 forming internal portion 706 is sintered (e.g., no hash-markings) when preform 726 is heated to the second sintering temperature. Ceramic material 734 forming external portion 702 remains sintered when preform 726 is heated to the second sintering temperature, as discussed herein with respect to FIG. 7D. As a result of heating preform 726 to the first sintering temperature (see, FIG. 7D) and subsequently heating preform 726 to the second sintering temperature (see, FIG. 7E), preform 726 is completely sintered.

Heating preform 726 to the second sintering temperature, as shown in FIG. 7E, results in internal portion 706 beginning to shrink or contract. Specifically, and similar to external portion 702 discussed with respect to FIG. 7D, ceramic material 734 forming internal portion 706 begins to shrink and/or contract when heating device 724 heats preform 726 to the second sintering temperature to sinter internal portion 706. Internal portion 706 shrinks or contracts less than external portion 702 when preform 726 is heated to the second sintering temperature to completely sinter preform 726. As shown in FIG. 7E, and with comparison to FIGS. 7B and 7D, second grain 738 of ceramic material 734 forming internal portion 706 shrinks or contracts an amount or distance less that the amount or distance of shrinkage achieved by first grain 736 of ceramic material 734 forming external portion 702. As discussed herein, the amount or distance of shrinkage is dependent on, at least in part, the thermal expansion characteristics of internal portion 706 and external portion 702.

In addition to beginning to shrink or contract internal portion 706, external portion 702 continues to shrink or contract when preform 726 is heated to the second sintering temperature. That is, although external portion 702 is already sintered when preform 726 is heated to the second sintering temperature, first grain 736 of ceramic material 734 forming external portion 702 continues to shrink or contract. In the non-limiting example shown in FIG. 7E, exterior surface 704 of external portion 702 is positioned below the pre-sintered position 732a of exterior surface 704 (see, FIG. 7B) prior to preform 726 being heated to the first sintering temperature. Exterior surface 704 of external portion 702 is also positioned below the partially-sintered position 732b of exterior surface 704 (see, FIG. 7D) subsequent to preform 726 being heated to the first sintering temperature, but prior to preform 726 being heated to the second sintering temperature.

As discussed herein with respect to external portion 702, the sintering and/or shrinkage of internal portion 706 of preform 726 is dependent on the altered thermal expansion characteristics of internal portion 706. The distinct grain sizes of first grain 736 and second grain 738 of ceramic material 734 causes the thermal expansion characteristics to be different or distinct between internal portion 706 and external portion 702. Additionally, the differences in the thermal expansion characteristics also account for the difference in the amount or rate of shrinkage or contraction between internal portion 706 and external portion 702. Continuing the examples discussed herein, external portion 702 has a higher CTE, lower sintering temperature and/or higher sintering rate when compared to internal portion 706. As such, and as described above with respect to FIGS. 7D and 7E, external portion 702 continues to shrink or contract at a second sintering temperature, while internal portion 706 sinters and/or begins to shrink or contract at the second sintering temperature. Additionally, external portion 702 shrinks or contracts a greater amount or distance than internal portion 706 when preform 726 is heated to the second sintering temperature as a result of the difference in the thermal expansion characteristics between internal portion 706 and external portion 702.

The processes performed on preform 726, as shown and discussed herein with respect to FIGS. 7C-7E, may correspond to operation 604 of the process 600 shown in FIG. 6.

Figure 7F:
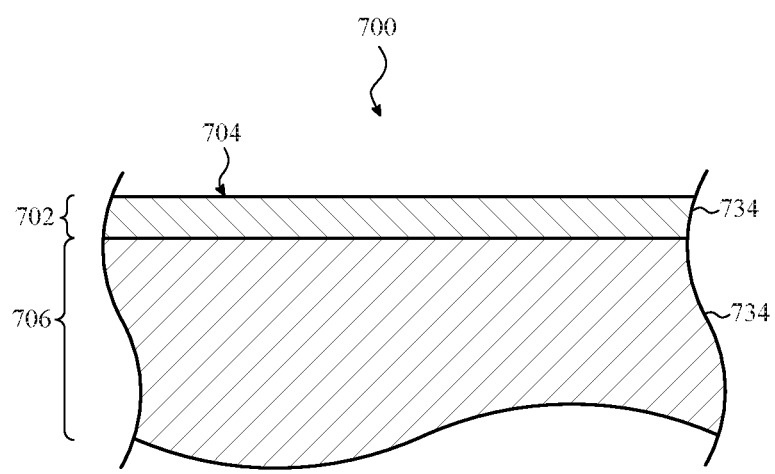
FIG. 7F shows a side cross-section view of a ceramic component formed from the ceramic material of FIG. 7A. The ceramic component has an external portion and an internal portion.

FIG. 7F shows preform 726 (see, FIG. 5C) subsequent to being completely sintered and/or cooled. Specifically, preform 726 is heated to the first and second predetermined sintering temperature, such that internal portion 706 and external portion 702 are sintered. Subsequent to sintering preform 726, preform 726 is cooled. The cooling of preform 726 results in the formation of ceramic component 700. In a non-limiting example shown in FIG. 7F, when preform 726 is cooled, ceramic component 700 is formed including internal portion 706 and external portion 702 substantially surrounding internal portion 706. As such, FIG. 7F refers to previously discussed preform 726 as ceramic component 700.

Although shown with distinct hash-markings similar to those shown in FIGS. 1B and 3G for example, it is understood that ceramic component 700 is formed from a single material. Specifically, ceramic component 700 is formed from ceramic material 734 that is compositionally similar in both external portion 702 and internal portion 706. As discussed herein, the distinction between external portion 702 and internal portion 706 of ceramic component 700 is the material grain size of first grain 736 of external portion 702 and second grain 736 of internal portion 706. It is understood that the hash-markings for external portion 702 and internal portion 706 shown in FIG. 7F are included merely to identify the distinct portions of ceramic component more clearly and do not necessarily represent that external portion 702 and internal portion 706 are formed from distinct materials, as discussed in distinct example embodiments herein.

As similarly discussed herein with respect to FIGS. 5E and 5F, ceramic component 700 is cooled down to a predetermined temperature naturally or organically by removing heat supplied by heating device 724 (see, FIG. 7C), or alternatively, is rapidly cooled by submerging the ceramic component 500 in a bath of cold liquid. Additionally, and as discussed herein with respect to FIGS. 5E and 5F, cooling ceramic component 700 can result in further shrinkage and/or contraction of ceramic component 700, where internal portion 706 and external portion 702 of ceramic component 700 contract and/or shrink a different amount or distance, and/or at a different rate during the cooling process. This is also similar to the discussion of internal portion 706 and external portion 702 shrinking during the sintering process (see, FIGS. 7C-7E). Specifically, external portion 702 may shrink a greater amount or distance and/or at a higher rate during the cooling process when compared to internal portion 706 of ceramic component 700. As discussed herein, the shrinking or contracting of internal portion 706 and external portion 702 is dependent on, at least in part, the thermal expansion characteristics of each portion.

In another non-limiting example, once the cooling process of ceramic component 700 begins, the shrinking of the ceramic component 700 stops and/or is discontinued. As a result, once ceramic component 700 is starting to be cooled, external portion 702 and internal portion 706 of ceramic component 700 no longer shrinks and/or contracts. In the non-limiting example, the positioning of first grain 736 of ceramic material 734 forming external portion 702 and second grain 738 of ceramic material 734 forming internal portion 706 will be similar to that shown in FIG. 7E, as previously discussed herein.

The sintering, cooling and the corresponding shrinkage and/or contraction of ceramic component 700 also results in the formation of distinct stresses within ceramic component 700, as similarly discussed herein. Specifically, when sintered ceramic component 700 is cooled, and ceramic component 700 shrinks and/or contracts, distinct stresses are formed within and/or experienced by the various portions (e.g., external portion 702, internal portion 706) of ceramic component 700. In a non-limiting example, and as discussed herein, a compressive stress is formed within external portion 702, as a result of external portion 702 shrinking and/or contracting more than internal portion 706 due to the differences in thermal expansion characteristics. Additionally, a tensile stress is formed within internal portion 706 as a result of the shrinking or contracting occurring in internal portion 706 and/or the shrinking or contracting of external portion 702 around internal portion 706 of ceramic component 700.

The processes performed on preform 726 and/or ceramic component 700, as shown and discussed herein with respect to FIGS. 7E and 7F, may correspond to operations 606 and 608 of the process 600 shown in FIG. 6.

Figure 8:
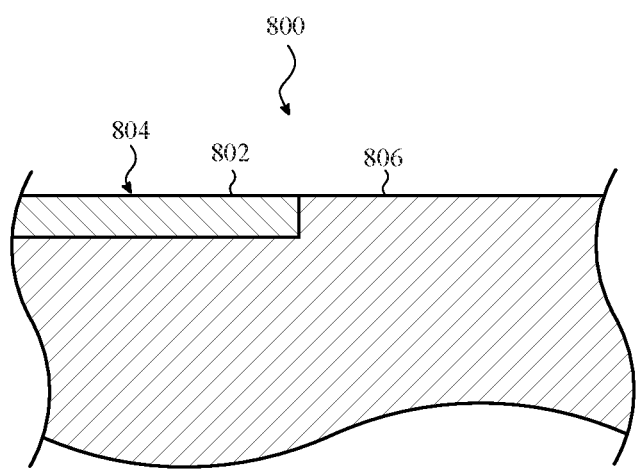
FIG. 8 shows a side cross-section view a ceramic component having a selective compressive stress formed therein.

FIG. 8 shows a side cross-section view of ceramic component 800 having selective compressive stress formed therein. As shown in FIG. 8, external portion 802 only forms a portion of exterior surface 804, and internal portion 806 of ceramic component 800 forms the remaining portion of exterior surface 804. As discussed herein with respect to FIGS. 2-7F, external portion 802 provides a residual compressive stress to ceramic component 800, while internal portion 806 provides a tensile stress. The compressive stress improves the strength, toughness, brittleness and/or improves protection against damage to the ceramic component, as well as mitigates and/or prevents the spreading of surface defects within the ceramic component 800, as discussed herein. As a result, the formation of selective compressive stress, as shown in FIG. 8, is beneficial when ceramic component 800 is utilized in a manner that makes certain or specific portions more susceptible to damage than others. In a non-limiting example discussed herein with respect to FIG. 10, ceramic component 800 can form a cover for an electronic device. As a result, it would be beneficial to selectively form compressive stress and/or external portion 802 on or around a border or perimeter of ceramic component 800, which may be more susceptible to damage when the electronic device utilizing ceramic component 800 is dropped, for example.

Forming selective external portion 802 and/or compressive stress on ceramic component 800 is achieved by modifying any of the processes discussed herein. In a non-limiting example where the ceramic substrate forming ceramic component 800 is pre-sintered, the dopant material applied to exterior surface 804 may be selectively applied, such that only a portion of the ceramic substrate undergoes the processes for forming ceramic component 800 having a selective, residual compressive stress (see, FIGS. 2-3G). In another non-limiting example where ceramic component 800 is formed from a green body ceramic preform, only a select area of the portion of the preform forming the exterior surface can include doped, ceramic material and/or material having a distinct (e.g., smaller) grain size. In the non-limiting example, when the preform is sintered, the compressive stress will be selectively formed in the select area of the preform, including the doped, ceramic material and/or distinct grain size area.

Figure 9:
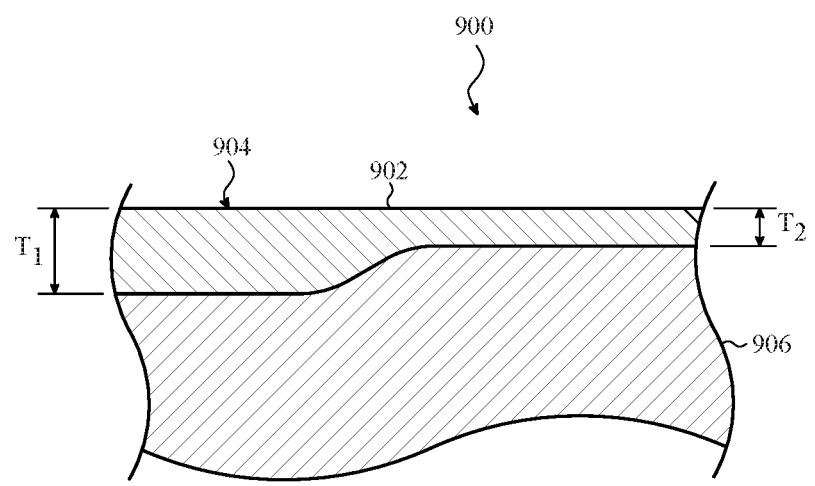
FIG. 9 shows a side cross-section view of a ceramic component having a varying thickness external portion and an internal portion.

FIG. 9 shows a side cross-section view of a ceramic component 900 having varying thickness external portion 902. As shown in FIG. 9, external portion 902, which provides a residual compressive stress to ceramic component 900 as discussed herein, includes a portion having a first thickness ($T_1$) and a second thickness ($T_2$), where the first thickness ($T_1$) is greater than the second thickness ($T_2$). As a result of the distinct thicknesses for external portion 902, the compressive stress formed in ceramic component 900 also varies. In a non-limiting example, the compressive stress formed in ceramic component 900 adjacent external portion 902 having the first thickness ($T_1$) is greater than the compressive stress formed in ceramic component 900 adjacent external portion 902 having the second thickness ($T_2$). Similar to FIG. 8, the formation of varying compressive stress, as shown in FIG. 9, is beneficial when ceramic component 900 is utilized in a manner that makes certain or specific portions more susceptible to damage than others. In the non-limiting example discussed herein with respect to FIG. 10, where ceramic component 900 forms a cover for an electronic device, it would be beneficial to improve or increase the compressive stress on or around a border or perimeter of ceramic component 900 (e.g., first thickness ($T_1$)) than the center of ceramic component 900 (e.g., first thickness ($T_1$)). This is true when the border or perimeter of ceramic component 900 is more susceptible to damage when the electronic device utilizing ceramic component 900 is dropped, for example.

The varying thickness of external portion 902 can be formed in ceramic component 900 by modifying any of the processes discussed herein. In a non-limiting example where the ceramic substrate forming ceramic component 900 is pre-sintered, the dopant material applied to exterior surface 904 may be applied more heavily in a specific area of exterior surface 904, such that more atoms of the dopant material can be diffused in an selective area of ceramic component 900 (see, FIGS. 2-3G). In conjunction with or separate from the increased application of dopant material in a selective area, the dopant material applied to the area desired to have a greater thickness (e.g., first thickness ($T_1$)) of external portion 902 can be a different material and/or have a distinct concentration of dopant material different than the remaining dopant material applied to the ceramic substrate forming ceramic component 900. Additionally, the area desired to have a greater thickness (e.g., first thickness ($T_1$)) of external portion 902 can be selectively heated to a higher temperature and/or for a longer period of time, to increase diffusion between the dopant material and the ceramic substrate.

In another non-limiting example where ceramic component 900 is formed from a green body ceramic preform, select areas of external portion 902 of the preform forming the exterior surface 904 can include more doped, ceramic material and/or material having a smaller grain size than internal portion 906 and the remaining portion of external portion 902, respectively. In the non-limiting example, when the preform is sintered, the compressive stress formed in ceramic component 900 by external portion 902 will be greater or larger in the selected area of the preform including the doped, ceramic material and/or smallest grain size.

Figure 10:
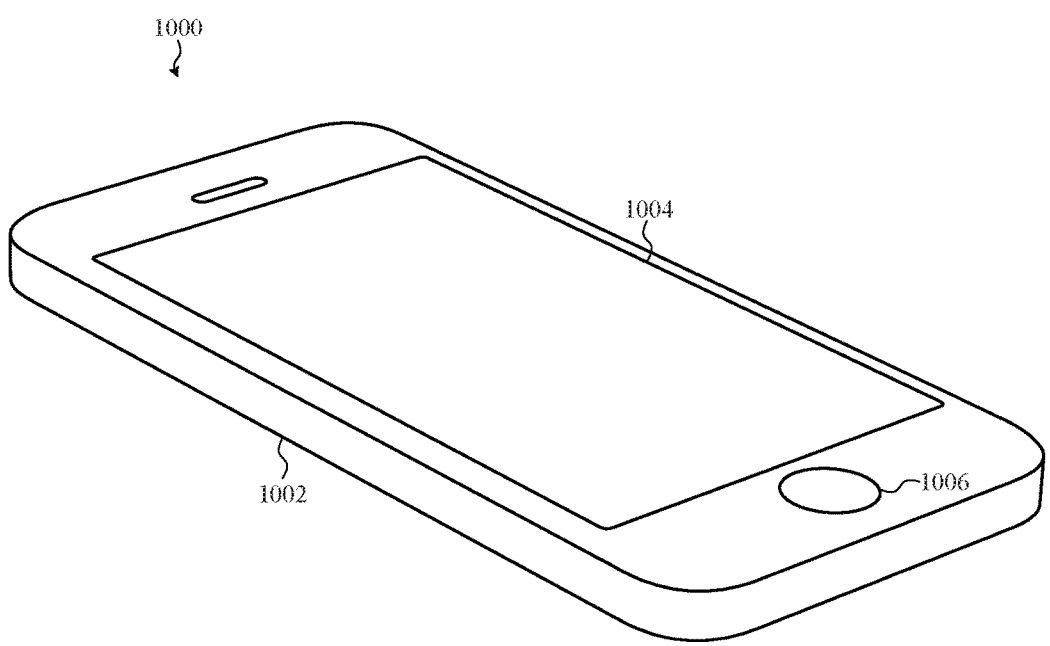
FIG. 10 shows an isometric view of an electronic device that may utilize the ceramic component having an external portion and an internal portion, as discussed, with respect to FIGS. 1A-9.

FIG. 10 shows an isometric view of an electronic device 1000. As discussed herein, electronic device 1000 includes various components that may utilize the ceramic component discussed herein with respect to FIGS. 1A-9. As shown in FIG. 10, electronic device 1000 is implemented as a mobile phone. Other embodiments can implement electronic device 1000 differently, such as, for example, as a laptop or desktop computer, a tablet computing device, a gaming device, a display, a digital music player, a wearable computing device or display, a health monitoring device, and so on.

Electronic device 1000 includes a housing 1002 at least partially surrounding a display module, a cover 1004 substantially covering the display module and one or more buttons 1006 or input devices. Housing 1002 can form an outer surface or partial outer surface and protective case for the internal components of the electronic device 1000 and may at least partially surround the display module positioned within an internal cavity formed by housing 1002. Housing 1002 can be formed of one or more components operably connected together, such as a front piece and a back piece (not shown). Alternatively, housing 1002 can be formed of a single piece operably connected to the display module. Housing 1002 may be formed from any suitable material that may house and/or may protect the internal components of electronic device 1000, including the display module. In non-limiting examples, housing 1002 may be formed from glass, sapphire or metal.

The display module may be substantially surrounded by housing 1002 and/or may be positioned within an internal cavity formed by housing 1002. The display module can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The display module may be positioned within an internal cavity of housing 1002 and may be substantially protected on almost all sides by housing 1002.

Cover 1004 may be formed integral with and/or may be coupled to housing 1002 to substantially cover and protect the display module. Cover 1004 may cover at least a portion of the front surface of electronic device 1000. When a user interacts with the display module of electronic device 1000, the user may touch or contact cover 1004. Cover 1004 of electronic device 1000 may include the toughened ceramic component discussed herein with respect to FIGS. 1A-9, to protect electronic device 1000 and to prevent and/or mitigate damage to cover 1004 during an undesirable shock event (e.g., drop). In a non-limiting example shown in FIG. 10, the toughened ceramic component discussed herein (see, FIGS. 1A-9) may form cover 1004 coupled to housing 1002 and positioned over the display module. By utilizing the toughened ceramic component discussed herein to form cover 1004 for electronic device 1000, cover 1004 may have improved strength, toughness, brittleness and/or improved protection against damage to the ceramic component.

Button 1006 can take the form of a home button, which may be a mechanical button, a soft button (e.g., a button that does not physically move but still accepts inputs), an icon or image on a display, and so on. Further, in some embodiments, button 1006 can be integrated as part of cover 1004 of the electronic device 1000. Button 1006, like housing 1002, may be formed from any suitable material that may withstand an undesirable drop event that may occur with electronic device 1000. In non-limiting examples, button 1006 may be formed from glass, sapphire or metal.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
 a housing having an opening; and
 a transparent ceramic cover positioned at least partially within the opening and defining an exterior surface of the electronic device, the cover comprising:
  a singular sintered ceramic structure comprising:
   an external portion comprising a perimeter region and a center region, the perimeter region having a first thickness and the center region having a second thickness that is less than the first thickness;
   an internal portion surrounded by the external portion; and
   at least one of yttrium, silicon, germanium, or chromium dopant atoms distributed within the singular sintered ceramic structure, the dopant atoms having a first dopant concentration at the external portion and a second, lower dopant concentration at the internal portion, a concentration of dopant atoms decreasing from the first dopant concentration to the second dopant concentration to define a dopant gradient, wherein the external portion has a coefficient of thermal expansion that is different than a coefficient of thermal expansion of the internal portion.

2. The electronic device of claim 1, wherein the external portion has a lower coefficient of thermal expansion than the internal portion.

3. The electronic device of claim 1, wherein the external portion defines substantially all of a top surface and a bottom surface of the ceramic cover.

4. The electronic device of claim 1, wherein:
 a compressive residual stress of the transparent ceramic cover at the first portion is greater than a compressive residual stress of the transparent ceramic cover at the second portion.

5. The electronic device of claim 1, wherein the singular sintered ceramic structure comprises at least one of: zirconia, alumina ($Al_2O_3$), silicon carbide, or silicon nitride.

6. The electronic device of claim 1, wherein the transparent ceramic cover is positioned over a display of the electronic device.

* * * * *